(12) United States Patent
Webster et al.

(10) Patent No.: US 9,169,359 B2
(45) Date of Patent: Oct. 27, 2015

(54) FUNCTIONALIZED SILICONES WITH POLYALKYLENE OXIDE SIDE CHAINS

(75) Inventors: Dean C. Webster, Fargo, ND (US); Rajan B. Bodkhe, Woodbury, MN (US)

(73) Assignee: NDSU Research Foundation, Fargo, ND (US)

(*) Notice: Subject to any disclaimer, the term of this patent is extended or adjusted under 35 U.S.C. 154(b) by 0 days.

(21) Appl. No.: 14/127,053

(22) PCT Filed: Jun. 15, 2012

(86) PCT No.: PCT/US2012/042762
§ 371 (c)(1),
(2), (4) Date: Mar. 6, 2014

(87) PCT Pub. No.: WO2013/052181
PCT Pub. Date: Apr. 11, 2013

(65) Prior Publication Data
US 2014/0221549 A1  Aug. 7, 2014

Related U.S. Application Data

(60) Provisional application No. 61/498,247, filed on Jun. 17, 2011.

(51) Int. Cl.
| | |
|---|---|
| C08G 77/20 | (2006.01) |
| C08G 77/442 | (2006.01) |
| C08G 77/26 | (2006.01) |
| C08G 77/46 | (2006.01) |
| C08G 18/61 | (2006.01) |
| C08G 18/62 | (2006.01) |
| C08G 18/79 | (2006.01) |
| C08G 18/40 | (2006.01) |
| C08G 77/445 | (2006.01) |
| C09D 5/16 | (2006.01) |
| C08G 77/458 | (2006.01) |

(52) U.S. Cl.
CPC .......... *C08G 77/442* (2013.01); *C08G 18/4063* (2013.01); *C08G 18/61* (2013.01); *C08G 18/6225* (2013.01); *C08G 18/792* (2013.01); *C08G 77/26* (2013.01); *C08G 77/445* (2013.01); *C08G 77/458* (2013.01); *C08G 77/46* (2013.01); *C09D 5/1637* (2013.01); *C08G 77/20* (2013.01)

(58) Field of Classification Search
CPC ....... C08G 77/20; C08G 77/26; C09D 183/12
USPC .................................................... 528/32, 23
See application file for complete search history.

(56) References Cited

U.S. PATENT DOCUMENTS

| | | |
|---|---|---|
| 4,855,379 A | 8/1989 | Budnik et al. |
| 4,861,670 A | 8/1989 | Lampe et al. |
| 5,079,298 A | 1/1992 | Kuriyama et al. |
| 5,412,133 A | 5/1995 | Eckberg |
| 5,449,553 A | 9/1995 | Griffith |
| 5,906,893 A | 5/1999 | Stein |
| 6,534,077 B2 * | 3/2003 | Policello et al. .............. 424/405 |
| 7,799,434 B2 | 9/2010 | Webster et al. |
| 7,989,074 B2 | 8/2011 | Webster et al. |
| 8,299,200 B2 | 10/2012 | Webster et al. |
| 2002/0156224 A1 | 10/2002 | Arimura et al. |
| 2008/0207825 A1 | 8/2008 | Stark |
| 2008/0213599 A1 | 9/2008 | Webster et al. |
| 2009/0111937 A1 | 4/2009 | Webster et al. |
| 2009/0169818 A1 | 7/2009 | Michel |
| 2010/0280148 A1 | 11/2010 | Webster et al. |

FOREIGN PATENT DOCUMENTS

| | | |
|---|---|---|
| WO | WO 95/03355 A1 | 2/1995 |
| WO | WO 2008/008077 A2 | 1/2008 |
| WO | WO 2009/025924 A2 | 2/2009 |
| WO | WO 2013/052181 A2 | 4/2013 |
| WO | WO 2013/052181 A3 | 6/2013 |

OTHER PUBLICATIONS

Bodkhe, "Synthesis and characterization of novel α, ω-functional siloxanes with PEG sidechains," Abstract 100 accompanying oral presentation in the Division of Polymeric Materials: Science and Engineering on Aug. 29, 2011, at the *242nd American Chemical Society National Meeting Fall 2011*: Denver, CO; Aug. 28-Sep. 1, 2011. Available online [retrieved on Jan. 15, 2015]. Retrieved from the Internet: <abstracts.acs.org/chem/242nm/program/view.php?obj_id=89589&terms=>; 1 pg.

Bodkhe, "Synthesis and characterization of novel α, ω-functional siloxanes with PEG sidechains," Jun. 22, 2011 *PMSE Preprints* 105:31-32; 17 pg.

Bodkhe et al., "Effect of siloxane molecular weight and content on fouling release performance of siloxanepolyurethane coatings using combinatorial high throughput methods" 2008 *PMSE Prepr*. 99:376-377.

Bodkhe et al., "Polyurethanes with Amphiphilic Surfaces made Using Telechelic Functional PDMS Having Orthogonal Acid Functional Groups" Sep.-Oct. 2012 *Prog. Org. Coat.*, 75(1-2): 38-48; Available online Apr. 7, 2012.

Bodkhe et al., "The Effect of Formulation Variables on Fouling-Release Performance or Stratified Siloxane-polyurethane Coatings" 2012, *J. Coat. Technol. Res*. 9:235-249; Available online Sep. 13, 2011.

Brady, "Clean Hulls Without Poisons: Devising and Testing Non-toxic Marine Coatings" 2000 *J. Coat. Technol*. 72(900):44-56.

Cassé et al., "Combinatorial Materials Research Applied to the Development of New Surfaces Coatings V. Application of a Spinning Water-Jet for the Semi-High Throughput Assessment of the Attachment Strength of Marine Fouling Algae," 2007 *Biofouling* 23(2):121-130.

Cassé et al., "Laboratory Screening of Coating Libraries for Algal Adhesion," 2007 . *Biofouling* 23(3/4):267-276.

Castner et al., "Biomedical Surface Science: Foundations to Frontiers" Mar. 10, 2002 *Surf. Sci.*, 500(1-3):28-60.

(Continued)

*Primary Examiner* — Kuo-Liang Peng
(74) *Attorney, Agent, or Firm* — Mueting, Raasch & Gebhardt, P.A.

(57) ABSTRACT

Novel silicone polymers are provided which possess grafted pendant hydrophilic polyalkylene oxide side chains and, optionally, reactive functional end groups. These features make them well suited for use in chemical, marine, biomedical and industrial applications, particularly those involving surface modifications.

25 Claims, 7 Drawing Sheets

(56) References Cited

OTHER PUBLICATIONS

Cho et al., "Triblock Copolymers with Grafted Fluorine-Free, Amphiphilic, Non-Ionic Side Chains for Antifouling and Fouling-Release Applications," Published May 24, 2011 *Macromolecules*, 44(12):4783-4792.

Crowe-Willoughby et al., "Formation and Properties of Responsive Siloxane-Based Polymeric Surfaces with Tunable Surface Reconstruction Kinetics," Feb. 10, 2009 *Adv. Funct. Mat.*, 19(3):460-469.

Ekin et al., "Synthesis and Characterization of Novel Hydroxyalkyl Carbamate and Dihydroxyalkyl Carbamate Terminated Poly(dimethylsiloxane) Oligomers and their Block Copolymers with Poly(ε-caprolactone)," 2006 *Macromolecules* 39(25):8659-8668.

Ekin et al., "Effect of PDMS composition on the surface and bulk properties of crosslinked siloxane-urethane coatings," 2006 *Polym. Prepr.* 47(2):1117-1118.

Ekin et al., "Synthesis and characterization of novel carbamate linked Di- and tetra-functional poly(dimethylsiloxane) oligomers and their block copolymers with poly(ε-caprolactone) using combinatorial and high-throughput methods," 2006 *Polym. Prepr.* 47(2):1204-1205.

Ekin et al., "Library synthesis and characterization of 3-aminopropyl-terminated poly(dimethylsiloxane)s and poly(∈-caprolactone)-b-poly(dimethylsiloxane)s" Aug. 2006 *J. Polym. Sci, Part A: Polym. Chem.*, 44(16), 4880-4894.

Ekin et al., "Combinatorial and High-Throughput Screening of the Effect of Siloxane Composition on the Surface Properties of Crosslinked Siloxane-Polyurethane Coatings," 2007 *J. Comb. Chem.* 9(1):178-188.

Ekin et al., "Synthesis, Formulation, and Characterization of Siloxane—Polyurethane Coatings for Underwater Marine Applications Using Combinatorial High-Throughput Experimentation" Dec. 2007 *J. Coat. Technol. Res.*, 4(4):435-451.

Everall, "Confocal Raman Microscopy: Why the Depth Resolution and Spatial Accuracy Can Be Much Worse than You Think," 2000 *J. Appl. Spectrosc.* 54(10):1515-1520.

Finlay et al., "Effect of Background Colour on Growth and Adhesion Strength of Ulva Sporelings" 2008 *Biofouling*, 24(3):219-225.

Finlay et al., "Barnacle settlement and the adhesion of protein and diatom microfouling to xerogel films with varying surface energy and water wettability" 2010 *Biofouling*, 26(6):657-666; Available online Jul. 20, 2010.

Geesey, "Bacterial behavior at surfaces" Jun. 2001 *Curr. Opin. Microbiol.*, 4(3):296-300.

Griesser et al., "Interfacial properties and protein resistance of nanoscale polysaccharide coatings" 2002 *Smart Mat. Struct.*,11(5):652.

Gudipati et al., "The Antifouling and Fouling-Release Performance of Hyperbranched Fluoropolymer (HBFP)-Poly(ethylene glycol) (PEG) Composite Coatings Evaluated by Adsorption of Biomacromolecules and the Green Fouling Alga *Ulva*" 2005 *Langmuir*, 21(7):3044-3053.

Hester et al., "ATRP of Amphiphilic Graft Copolymers Based on PVDF and Their Use as Membrane Additives" 2002 *Macromolecules*, 35(20):7652-7661.

Holland et al., "Adhesion and motility of fouling diatoms on a silicone elastomer" Dec. 2004 *Biofouling*, 20(6):323-329.

Hoyle et al., "Thiol-Ene Click Chemistry" Feb. 22, 2010 *Angew. Chem. Int'l Ed.*, 49(9):1540-1573.

Hu et al., "Hydrogen-Bonding-Induced Complexation of Polydimethylsiloxane-grat-poly(ethylene oxide) and Poly(acrylic acid)-block-polyacrylonitrile Micelles in Water" 2010 *Langmuir*, 26(18):14502-14508; Available online Aug. 19, 2010.

Iguerb et al., "Antifouling properties of poly(methyl methacrylate) films grafted with poly(ethylene glycol) monoacrylate immersed in seawater" Nov. 4, 2008 *Langmuir*, 24(21):12272-12281.

Jones, *Silicon-Containing Polymers: The Science and Technology of Their Synthesis and Applications*; Kluwer Academic Publishers; Dordrecht, The Netherlands; 2000, Cover page, title page, table of contents, and pp. 18-20.

Kavanagh et al., "Observations of Barnacle Detachment from Silicones Using High-Speed Video" 2005 *J. Adhes.* 81(7-8):843-868.

Krishnan et al., "Comparison of the Fouling Release Properties of Hydrophobic Fluorinated and Hydrophilic PEGylated Block Copolymer Surfaces: Attachment Strength of the Diatom *Navicula* and the Green Alga *Ulva*" May 2006 *Biomacromolecules*, 7(5):1449-1462.

Krishnan et al., "Anti-Biofouling Properties of Comblike Block Copolymers with Amphiphilic Side Chains" 2006 *Langmuir*, 22(11):5075-5086.

Kunzler et al., "Methacrylate-Capped Fluoro Side-Chain Siloxanes—Synthese, Characterization, and their use in the Design of Oxygen-Permeable Hydrogels"1997 *J. Appl. Polym. Sci.*, 65(6):1081-1089.

Majumdar et al., "Preparation of siloxane—Urethane coatings having spontaneously formed stable biphasic microtopograpical surfaces" 2005 *Macromolecules*, 38(14):5857-5859.

Majumdar et al. "Thermoset Siloxane-Urethane Fouling Release Coatings" 2007 *ACS Symp. Ser.* 957(Smart Coatings): 61-75.

Mather et al., "Michael addition reactions in macromolecular design for emerging technologies" *Prog. Polym. Sci.* 2006, 31:487-531.

McCarthy et al., "Advanced Marine Coatings for Naval Vessels—Phase I. Antifouling and Fouling Release Coatings" Sep. 30, 2003 NDSU CNSE Report 01-01, Retrieved from the Internet: <URL:http:www.dtic.mil/cgi-bin/GetTRDocAD=ADA41748>; 48 pages.

Mura et al., "Raman microscopic studies of the distribution of the fungicide fluorfolpetin plasticised PVC films" 2000 *Polymer*, 41(24):8659-8671.

Ostuni et al., "Adsorption of Proteins to Hydrophobic Sites on Mixed Self-Assembled Monolayers" 2003 *Langmuir*, 19(5):1861-1872.

Owens et al., "Estimation of the Surface Free Energy of Polymers" Aug. 1969 *J. Appl. Polym. Sci.*, 13(8):1741-1747.

Patel et al., "Surface and bulk phase separation in block copolymers and their blends. Polysulfone/polysiloxane" 1988 *Macromolecules*, 21(9):2689-2696.

Pieper et al., "A combinatorial approach to study the effect of acrylic polyol composition on the properties of crosslinked siloxane-polyurethane fouling-release coatings," 2007 *Technol. Res.* 4(4):453-461.

Prime et al., "Adsorption of Proteins onto Surfaces Containing End-Attached Oligo(ethylene oxide): A Model System Using Self-Assembled Monolayers" 1993 *J. Am. Chem. Soc.*, 115(23):10714-10721.

Ratner et al., "Biomaterials: Where We Have Been and Where We Are Going" Aug. 2004 *Ann. Rev. Biomed. Eng.*, 6:41-75.

Rittschof et al., "Barnacle reattachment: a tool for studying barnacle adhesion" 2008 *Biofouling*, 24(1):1-9.

Schmidt et al., "Study of the Conformations of Poly(Epsilon-Caprolactam) and Poly(Epsilon-Caprolactam)-Polybutadiene Block-Copolymers by FTIR Spectroscopy with Photoacoustic Detection and by Micro-Raman Confocal Spectroscopy" 1997 *J., Polymer*, 38(9):2067-2075.

"Silicones" in *Encyclopedia of Polymer Science and Technology* Wiley:2003. 765-841.

Smith et al., "Synthesis and Characterization of Poly(methyl methacrylate)-g-poly (dimethylsiloxane) Copolymers. 1. Bulk and Surface Characterization" May 1992 *Macromolecules*, 25:2575-81.

Sommer et al., "A Preliminary Study on the Properties and Fouling-Release Performance of Siloxane-Polyurethane Coatings Prepared from Poly(dimethylsiloxane) (PDMS) Macromers" Nov. 2010 *Biofouling*, 26(8), 961-972; Available online Nov. 1, 2010.

Sommer et al., "Effects of Pigmentation on Siloxane-Polyurethane Coatings and Their Performance as Fouling-Release Marine Coatings" 2011 *J. Coat. Tech. Res.*, 8:661-670; Available online Aug. 6, 2011.

Stafslien et al., "Combinatorial Materials Research Applied to the Development of New Surface Coatings. IV. A High-Throughput Bacterial Biofilm Retention and Retraction Assay for Screening Fouling—Release Performance of Coatings" 2007 *Biofouling*, 23(1/2):45-54.

Stafslien et al., "Combinatorial Materials Research Applied to the Development of New Surface Coatings. VI: An Automated Spinning Water Jet Apparatus for the High-Throughput Characterization of-

(56) References Cited

OTHER PUBLICATIONS

Fouling-Release Marine Coatings" 2007 *Rev. Sci. Instrum.*, 78(7):072204/1-072204/6.

Szleifer, "Polymers and Proteins: Interactions at Interfaces" 1997 *Curr. Opin. Solid State Mater. Sci.*, 2(3):337-344.

Wan et al., "Highly Efficient Condensation of Hydroxyl-Terminated Polyethylene Oxide with 3-Mercaptopropionic Acid Catalyzed by Hafnium Salt" Feb. 2008 *Reac. & Func. Polym.*, 68(2):431-435.

Wyszogrodzka et al., "Synthesis and Characterization of Glycerol Dendrons, Self-Assembled Monolayers on Gold: A Detailed Study of Their Protein Resistance" May 11, 2009 *Biomacromolecules*, 10(5):1043-1054.

Yebra et al., "Antifouling Technology—Past, Present and Future Steps Towards Efficient and Environmentally Friendly Antifouling Coatings" Jul. 2004 *Prog. Org. Coat.*, 2004 50(2):75-104.

Zhang et al., "Depth profiling of clear coil coating by confocal Raman microscopy" Oct. 2009 *Prog. Org. Coat.*, 66(2):141-148.

European Application No. EU 12 83 8324, filed Jan. 7, 2014; Supplementary Partial European Search Report issued Nov. 7, 2014; 5 pages.

PCT Application No. PCT/US12/42762, filed Jun. 15, 2012; International Search Report / Written Opinion issued Apr. 8, 2013; 12 pages.

PCT Application No. PCT/US2012/042762, filed Jun. 15, 2012; International Preliminary Report on Patentability issued Jan. 3, 2014; 8 pages.

\* cited by examiner

FUNCTIONALIZED SILICONES WITH POLYALKYLENE OXIDE SIDE CHAINS

GOVERNMENT FUNDING

This invention was made with government support under grants from the Office of Naval Research (ONR), Grant Nos. N00014-08-1-1149, N00014-09-1-1103 and N00014-11-1-1001. The U.S. Government has certain rights in this invention.

This application is the §371 U.S. National Stage of International Application No. PCT/US2012/042762, filed 15 Jun. 2012, which claims the benefit of U.S. Provisional Application Ser. No. 61/498,247, filed Jun. 17, 2011, which are incorporated by reference herein.

BACKGROUND

Surfaces having non-fouling characteristics facilitate the development of advanced materials for use in biomedical and marine applications.

In medical applications, a major problem associated with implanted and blood contact biomaterials is the triggering of a number of undesired responses including inflammation, infection, thrombosis, fibrosis, allergy, and biomaterial induced cancer. These unwanted responses are triggered with the rapid accumulation of a large number of blood plasma proteins when the materials come in contact with blood (Wyszogrodzka and Haag, *Biomacromolecules* 2009 10:1043-1054; Castner and Ratner, *Surf Sci.* 2002 500:28-60; Ratner and Bryant, *Annu. Rev. Biomed. Eng.* 2004 6:41-75).

In marine environments, surfaces become fouled rapidly due to biofouling. Biofouling is the unwanted accumulation of microorganism, plants, algae and animals on artificial structures immersed in water, such as sea, river or lake water. Biofilm formation, which involves adhesion of bacteria and diatoms, is the first step in the process of biofouling. The specific or nonspecific recognition of adsorbed organic material by bacteria is the main driving force for their adhesion (Iguerb et al., *Langmuir* 2008 24:12272-12281; Geesey, *Curr. Opin. Microbiol.* 2001 4:296-300). Bacteria use exopolymers and a protein matrix to cement themselves to a surface. Although adhesion of organisms to the surface is complicated, marine organisms attach to surfaces by a primary mechanism that involves wetting of the surface by secretion of a protein or glycoprotein adhesive (Iguerb et al., *Langmuir* 2008 24:12272-12281).

Materials can be modified with a surface coating to become protein resistant (Ostuni et al., *Langmuir* 2003 19:1861-1872; Hester et al., *Macromolecules* 2002 35:7652-7661; Griesser et al., *Smart Mat. Struct.* 2002 11:652). Materials containing PEG self-assembled monolayers (SAM) are commercially available and are prominent protein resistant materials (Wyszogrodzka and Haag, *Biomacromolecules* 2009 10:1043-1054; Szleifer, *Curr. Opin. Solid State Mater. Sci.* 1997 2:337-344). However, the SAM approach is not suitable for broad practical use. Improved protein-resistant coatings and surface modifications are of broad continuing interest in many technological, industrial and medical fields.

SUMMARY OF THE INVENTION

The present invention provides novel amphiphilic polymers, compositions, formulations, coatings and surface modifications that are effective to reduce or eliminate the attachment of biological materials, organic matter, or organisms to surfaces, particularly surfaces in contact with water or in aqueous environments. Generally, the polymers and coatings of the invention are termed "anti-fouling" for their ability to reduce or prevent adhesion of biological or organic matter such as proteins, bacteria, and the like to the coated surfaces.

More particularly, the present invention provides an amphiphilic silicone polymer that includes a hydrophobic component, such as a polysiloxane or a polysiloxane/polylactone copolymer, and a hydrophilic component, such as a polyalkylene glycol. The hydrophilic component is grafted onto the polysiloxane backbone, preferably via a thioether linkage. Polysiloxanes have many desirable properties such as low glass transition temperature, hydrophobicity, UV stability and high chain flexibility, and may be modified to provide more desirable mechanical or industrial properties according to their intended use. Polyalkylene glycols, such as polyethylene glycols (PEG), are of interest due to their protein resistant, nontoxic and nonimmunogenic properties.

Surface coverage by a grafted polymer is important for the ability of a polymer layer to prevent protein adsorption (Prime and Whitesides, *J. Am. Chem. Soc.* 1993 115:10714-10721; Szleifer, *Curr. Opin. Solid State Mater. Sci.* 1997 2:337-344). Hence, the present invention incorporates a protein resistant material like PEG into the polymer, with control over the amount of PEG on the surface. The anti-fouling polymer of the invention is amphiphilic, containing both hydrophobic and hydrophilic components. When used as or incorporated into a coating that is applied to the surface of a material, both hydrophilic and hydrophobic moieties are preferably present at the coating surface. It is well known that the lowest surface energy components of a solvent cast block copolymer preferentially segregate to the surface (Patel et al., *Macromolecules* 1988 21:2689-96; Smith et al., *Macromolecules* 1992 25:2575-81). By attaching a hydrophilic polymer or oligomer to a low surface energy polymer or oligomer such as polysiloxane, the hydrophilic component will be forced to segregate to the surface of the material along with the low surface energy polymer, resulting in an amphiphilic surface.

The polymers of the present invention are thus well suited for use in anti-fouling coating systems, either alone, incorporated into other polymers, or in combination with other polymers. The amphiphilic silicone polymer of the invention can, for example, be incorporated into a polyurethane (PU) to yield a siloxane-polyurethane fouling-release coating. Siloxane-polyurethane fouling-release coatings represent a non-toxic approach to combat biofouling and have already showed promising results in laboratory assays against a number of diverse marine organisms (U.S. Pat. No. 7,799,434; U.S. Pat. Appl. 20100280148). A siloxane-polyurethane system overcomes the drawback of durability and toughness associated with commercially available silicone elastomer fouling-release coatings. See, e.g., Yebra et al., *Prog. Org. Coat.* 2004 50:75-104. Polyurethanes are widely used as biomaterials due to their biocompatibility and toughness.

Formation of a polyurethane coating having an amphiphilic surface can, for example, be accomplished by first synthesizing siloxane polymers with terminal amine functionality and pendant PEG chains, then incorporating these PEGylated siloxane polymers into a thermoset PU system. The resulting polyurethane coatings can be characterized for their surface properties using water contact angle (WCA), confocal Raman microscopy (CRM), and attenuated total reflection-Fourier transform infrared (ATR-FTIR) spectroscopy, as illustrated in Example 1. The fouling-release performance of the coatings was tested in the laboratory using a suite of relevant marine fouling organisms. The low surface energy siloxane can aid in bringing PEG chains to the surface, and the terminal amine functionality can react with polyurethane so that it is incorporated into the coating system. Therefore, the surface of the material will be amphiphilic while the PU bulk will give toughness to the system.

Additionally, the method of the invention permits synthesis of amphiphilic coatings with compositional control over hydrophilic and hydrophobic components, thereby facilitating the synthesis of a wide variety of polymers that can be used to more broadly resist marine biofouling. The synthetic approach described herein allows for precise control over the number of hydrophilic PEG chains, siloxane and PEG chain lengths, and terminal amine functionality for further reaction. The amount of surface coverage by the PEG chains can be varied by changing the number and amount of pendant PEG chains.

Fouling-release coatings do not necessarily deter the attachment of marine organisms, but allow only a weak bond to form between marine organisms and the surface. Weakly attached organisms are "released" by the application of hydrodynamic forces such as a ship moving through the water. However, marine organisms exhibit different responses to various surface characteristics, thereby complicating efforts to combat biofouling. As an example, two types of marine algae, *Ulva linza* and *Navicula incerta* show exactly the opposite behavior with respect to adhesion to hydrophobic or hydrophilic surfaces. The green alga *Ulva linza* adheres weakly to hydrophobic surfaces, while the diaton *Nacvicula incerta* adheres strongly to hydrophobic surfaces including silicone elastomers (Finlay et al., *Biofouling* 2008 24:219-225; Holland et al., *Biofouling* 2004 20:323-329). Hydrophobic coatings based on polydimethylsiloxane (PDMS) and fluorinated block copolymers are efficient in release of *Ulva* while hydrophilic coatings based on block copolymers containing polyethylene glycol showed extremely good release performance against diatoms (Krishnan et al., *Biomacromolecules* 2006 7:1449-1462; Gudipati et al., *Langmuir* 2005 21:3044-3053; Krishnan et al., *Langmuir* 2006 22:5075-5086). An amphiphilic coating is expected to be effective in reducing adhesion of a broad variety of marine organisms as illustrated by the two different marine algae discussed above.

Accordingly, in one aspect, the present invention provides a polymer, preferably an amphiphilic graft polymer, that includes a polymeric silicone backbone, such as a polysiloxane backbone, and a plurality of hydrophilic polymeric pendant side chains that are linked to the silicone backbone through a thioether linkage. Optionally, the polymeric silicone backbone includes a reactive functional end group at one or both of its ends. In another embodiment, the polymer of the invention includes a polymeric silicone backbone, such as a polysiloxane backbone, that includes a reactive functional end group at one or both ends; and a plurality of hydrophilic polymeric pendant side chains. In this embodiment of the amphiphilic polymer, the hydrophilic polymeric pendant side changes may, but need not, be linked to the silicone backbone through a thioether linkage. The reactive functional end group, when present, is preferably an alkyl amine. The amphiphilic polymer of the invention is preferably prepared by the process of reacting a polyvinylsiloxane with a hydrophilic polymeric monothiol.

In a preferred embodiment of the amphiphilic polymer, the polymeric silicone backbone is formed from polydimethylsiloxane. Alternatively or additionally, the polymeric silicone backbone may be a copolymer of siloxane and lactone constituent units.

In a preferred embodiment of the amphiphilic polymer, the hydrophilic polymeric pendant side chains of the amphiphilic polymer include polyalkylene glycol, more preferably, polyethylene glycol.

In another aspect, the invention includes a polyurethane that incorporates the amphiphilic polymer as described herein.

In yet another aspect, the invention includes a composition, coating, film, adhesive, gel, oil or lubricant that includes a polymer as described herein. The invention further includes an article that includes said composition, coating, film, adhesive, gel, oil or lubricant, as well as an article having a surface coated with any of the polymers described herein.

In yet another aspect, the invention provides a method for making an amphiphilic polymer that includes combining a hydrophilic polymeric monothiol reactant and a polyvinylsiloxane reactant in the presence of a catalyst for a time and under conditions to yield an amphiphilic polymer characterized by a polysiloxane backbone and a plurality of hydrophilic polymeric pendant side chains. Optionally, the monothiol is supplied in molar excess. The polyvinylsiloxane reactant is preferably a linear polyvinylsiloxane that has a reactive functional group at one or both ends. Also included in the invention is an amphiphilic polymer prepared by the method of the invention.

In yet another aspect, the invention provides a method for making a polyvinylsiloxane that includes reacting a vinylated cyclic siloxane with at least one of a cyclic siloxane and a linear siloxane, in the presence of a catalyst under conditions and for a time sufficient to yield the polyvinylsiloxane. Preferably, the linear siloxane has one or two functional reactive end groups, such as an alkyl amine, and the polyvinylsiloxane product includes the functional reactive end group(s). Also included is a polyvinylsiloxane prepared by the method of the invention.

DETAILED DESCRIPTION OF ILLUSTRATIVE EMBODIMENTS

Figure 1:
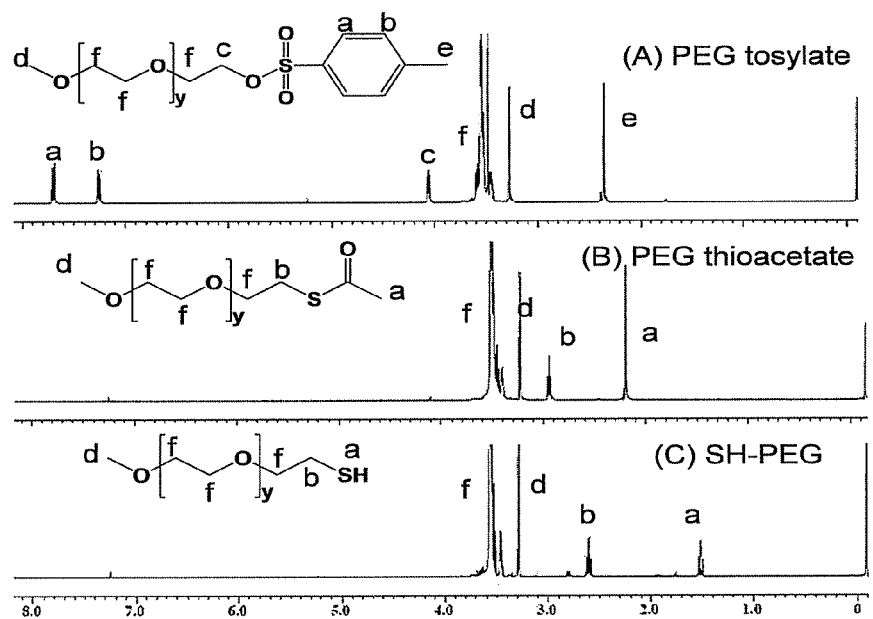
FIG. 1 shows an $^1$H NMR spectra of (A) PEG tosylate, (B) PEG thioacetate (C) SH-PEG in $CDCl_3$.
Figure 2:
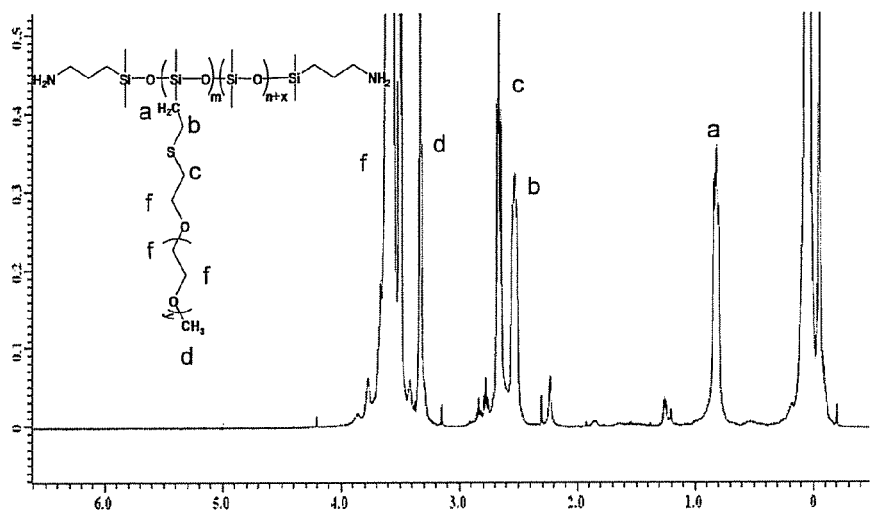
FIG. 2 shows an $^1$H NMR spectrum of siloxane-PEG copolymer.

Novel amphiphilic silicone polymers are provided which possess pendant hydrophilic side chains grafted onto a polymeric silicone backbone. The polymers of the invention are unique in that they incorporate hydrophobic (e.g., siloxane) and hydrophilic (e.g., PEG) components, as well as, optionally, reactive functional end groups, such as terminal amines. These features make them well suited for use in chemical, marine, biomedical and industrial applications, particularly those involving surface modifications.

The invention also provides methods for making the novel silicone polymers, as well as methods for making the reactants and intermediates involved in synthesizing the silicone polymers, are also included in the invention, as are methods of use. The reaction and resulting products can be varied by varying the molecular weights, mole ratios and chain length of the various reactants, as well as their mole ratios. Varying the reaction conditions and/or the starting materials allows control over the number of hydrophilic side chains, the amphiphilicity of the resulting product, the presence, absence and nature of the reactive functional groups available for subsequent reactions, and the like. For example, when the silicone-PEG graft polymers are used in surface modifications, the amount of surface coverage by the PEG side chains can be varied by changing the length of the pendant PEG side chains.

The silicone-PEG graft polymer of the invention, as well as other functionalized polymers which incorporate the silicone-PEG graft polymer of the invention, have a wide variety of uses in agriculture, medicine and industry. Embodiments which contain the reactive functional end groups, such as amines, permit reaction with other polymers to yield a wide array of PEG-functionalized polymers. For example, a silicone-PEG graft polymer can be incorporated into a polyurethane to yield a polyurethane having an amphiphilic surface. Polymers of the invention are useful in marine applications to coat boat surfaces, such as boat hulls, dock surfaces, the surfaces of underwater equipment and the like. They can be used as coatings in biomedical applications to inhibit or prevent protein adhesion to medical devices and surfaces. Because of their amphiphilic nature, they find use in industrial settings as surfactants, lubricants and the like. Compositions, coatings, films, adhesives, coated articles and the like that include the novel compounds described herein, as well as methods for making and using them, are therefore also included in the invention.

The hydrophilic side chain component of the amphiphilic silicone polymer can be an oligomer or polymer. The hydrophilic side chain is preferably a polyalkylene oxide; more preferably it is a polyalkylene glycol; even more preferably, it is a polyethylene glycol (PEG). The polyalkylene oxide preferably contains between 2 and 1000 repeating units, more preferably between 2 and 500 repeating units, most preferably 2 to 15 repeating units.

The silicone backbone component of the amphiphilic silicone polymer is preferably a polysiloxane, more preferably a polydialkylsiloxane. Polydimethylsiloxane (PDMS) is a particularly preferred silicone backbone although the dialkyl substituent can be diethyl, dipropyl, dibutyl and so on. The silicone backbone may take a variety of forms. For example, the silicone backbone may be an oligomer, a polymer, or a block copolymer. The silicone backbone optionally includes segments derived from one or more lactones to form a polysiloxane/polylactone block copolymer. For example, the silicone backbone can be block copolymer containing poly (ε-caprolactone) and polydimethylsiloxane units. One or more linking groups may be used to link the polysiloxane segment to the polylactone segment. See U.S. Pat. No. 7,799,434 (Webster et al.). It should be understood that the term "polysiloxane" as used herein is inclusive of copolymers that include siloxane units, such as polysiloxane/polylactone block copolymer.

The silicone backbone optionally contains reactive functional end groups. The reactive functional group can include an alkyl amine, hydroxyl, carboxylic acid or aldehyde. Examples of reactive functional groups are aminopropyl, hydroxypropyl, hydroxybutyl, hydroxypentyl, hydroxyethyoxypropyl, carboxypropyl, hydroxyalkyl carbamate, bis(hydroxy alkyl) carbamate, and the like. See, e.g., U.S. Pat. No. 7,799,434.

The hydrophilic side chain is preferably linked to the silicone backbone via a thioether linkage.

A preferred embodiment of the amphiphilic silicone polymer is a silicone-PEG graft polymer, which may at times be referred to herein as a "silicone-PEG graft polymers," "PEG-grafted silicone polymer," "PEGylated silicone polymers" and the like. It should be understood that silicone polymers grafted with PEG are illustrative of a preferred embodiment, and that references to PEG are not meant to exclude other hydrophilic polymer chains, for example other polyalkylene oxides, as well. In other words, PEGylated silicone polymers represent an exemplary embodiment and their synthesis is reported in the following examples, but the invention contemplates a silicone polymer grafted with any of a wide array of hydrophilic polymers, without limitation.

The novel silicone polymers of the invention may at times be referred to herein as copolymers, wherein the term copolymer refers to the inclusion in the graft polymer of the constituent silicone (e.g., siloxane) backbone polymer and the pendant hydrophilic side chain polymers.

As mentioned, the silicone-PEG graft polymer, as well as other functionalized polymers which incorporate the silicone-PEG graft polymer, have hydrophobic as well as hydrophilic character, rendering them amphiphilic. The synthesis of compounds that are both very hydrophobic and very hydrophilic, especially such compounds that contain functional groups making them capable of further reaction, is generally problematic since the reactive functional groups can potentially interfere with chemistries commonly used to attach side chains to siloxane polymers. For example, hydrosilylation of a methylhydride siloxane with a vinyl terminated PEG can be used to synthesize a PEG-modified silicone, but amine groups cannot be present since these can react with the hydrosilane. With the thiol-ene synthetic approach described herein, there is no such interference, and PEG-modified silicones can be synthesized having reactive functional groups.

Accordingly, methods for making the novel silicone polymers, as well as methods for making the reactants and intermediates involved in synthesizing the silicone polymers, are also included in the invention, as are methods of use.

In one method of the invention, the amphiphilic silicone polymer, such as a silicone-PEG graft polymer, is formed by reacting a hydrophilic polymeric monothiol reactant, such as polyalkylene glycol monothiol, for example polyethylene glycol monothiol (PEG-SH wherein the thiol group is an end group), with a polyvinylalklylsiloxane reactant, such as a polyvinylmethylsiloxane, e.g., polyvinyldimethylsiloxane. Formation of the PEG-grafted silicone polymer product proceeds via a reaction between the thiol group of the hydrophilic polymeric reactant (e.g., PEG-SH) and the vinyl group of the vinylated siloxane reactant, e.g., polyvinyldimethylsiloxane. In the resulting graft polymer, the hydrophilic polymer is linked to the polysiloxane backbone via a thioether. These reactants, as well as their precursors, are encompassed by the invention.

An exemplary synthesis of a polyvinylmethylsiloxane reactant is shown below, where n can range from 0 to about 50 and is preferably 0 to 15, more preferably 5 to 15; and wherein m can range from 0 to 2000 and is preferably 5 to 1000; and p can range from 1 to 2000 and is preferably 2 to 1000. X is a functional group and can be a primary amine, secondary amine, hydroxyl, carboxylic acid, aldehyde, carbamate and the like. Examples of suitable functional groups include an alkyl amine, aminopropyl, hydroxypropyl, hydroxybutyl, hydroxypentyl, hydroxyethyoxypropyl, carboxypropyl, hydroxy alkyl carbamate, and bis(hydroxy alkyl) carbamate. R is alkyl, aryl, alkylaryl, etheralkyl, and the like. For example R can be propyl, ethoxypropyl, etc.

defined above. Preferably, $R^3=R^4$=methyl. The cyclic polysiloxane component can be generalized in the same manner (not shown).

Additionally, the polyvinylsiloxane reactant can be more generally represented by the structure

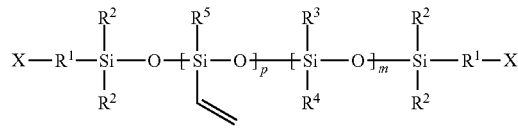

wherein $R^1$ is aliphatic or aryl, substituted or unsubstituted, preferably an alkyl such as methyl, ethyl, propyl and butyl; $R^2$ is alkyl such as methyl, ethyl, propyl and the like; $R^3$, $R^4$ and $R^5$ are each independently alkyl or substituted alkyl, such as methyl, vinyl, phenyl or trifluoropropyl; and X, p and m are as defined above. Preferably, $R^3=R^4=R^5$=methyl.

The polyvinylsiloxane reactant is formed from a combination of starting materials that include cyclic and linear siloxanes. Typically, the polyvinylsiloxane reactant is formed in a base-catalyzed equilibration reaction between a cyclic siloxane and a linear siloxane. The siloxane polymerization reaction involves a ring-opening equilibration. The cyclic monomer(s) are mixed with a low molecular weight oligomer with end groups (or a disiloxane that has end groups). Upon heating with the catalyst, the units are redistributed. The molecular weight of the final product will be proportional to the ratio of cyclics to linear in the starting mixture.

Exemplary cyclic siloxanes include hexamethylcyclotrisiloxane (D3), octamethylcyclotetrasiloxane (D4), decameth-

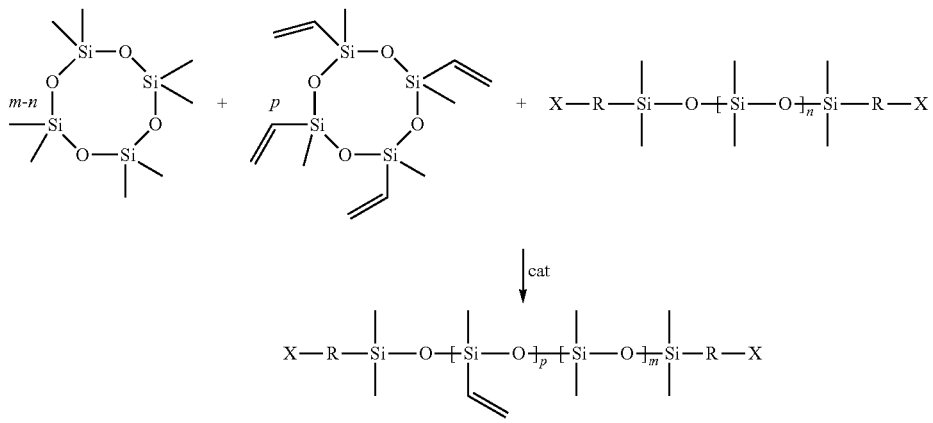

More generally, the linear polysiloxane component can be represented by the structure

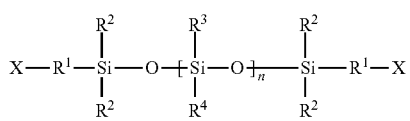

wherein $R^1$ is aliphatic or aryl, substituted or unsubstituted, preferably an alkyl such as methyl, ethyl, propyl and butyl; $R^2$ is alkyl such as methyl, ethyl, propyl and the like; $R^3$ and $R^4$ are each independently alkyl or substituted alkyl, such as methyl, vinyl, phenyl or trifluoropropyl; and X and n are as ylcyclopentasiloxane (D5) and dodecamethylcyclohexasiloxane (D6) and their vinyl counterparts, 1,3,5-trimethyl-1, 3,5-trivinylcyclotrisiloxane (D3v), 1,3,5,7-tetramethyl-1,3, 5,7-tetravinylcyclotetrasiloxane (D4v), 1,3,5,7,9-pentamethyl-1,3,5,7,9-pentavinylcyclopentasiloxane (D5v) and 1,3,5,7,9,11-hexamethyl-1,3,5,7,9,11 hexavinylcyclohexasilane (D6v). The cyclic siloxane used in the reaction includes a cyclic vinyl siloxane and, optionally, a cyclic dimethyl siloxane. The amount of PEG grafted onto the end product (the PEG-grafted silicone polymer) can be controlled by, for example, varying the relative amounts of vinylated vs. non-vinylated starting materials used to produce the polyvinylsiloxane reactant. The molar ratios of cyclic vinyl siloxane to cyclic dimethyl siloxane can range from 1:50 to 50:1, and any value in between, such as 1:20, 1:10, 1:1, 10:1, 20:1, and 50:1. The molar ratio is chosen to yield the desired amount of vinyl groups. The linear siloxane starting material can be a disiloxane or a low molecular weight polysiloxane, and is preferably a polydimethylsiloxane. The linear siloxane starting material is preferably not vinylated, although it may be, in which case both a vinylated form and a non-vinylated form of the linear siloxane starting material may be used. Optionally, the linear siloxane starting material is functionalized at one or both ends with a reactive functional group, such as an alkyl amine, hydroxyl, carboxylic acid, aldehyde or carbamate. Examples are aminopropyl, hydroxypropyl, hydroxybutyl, hydroxypentyl, hydroxyethyoxypropyl, carboxypropyl, and the like. An amine is the preferred reactive functional group, and an exemplary linear siloxane is one that is amino-propyl terminated (APT). In the final product (the PEG-graft silicone polymer) the reactive functional group is positioned at the ends of the siloxane backbone of the grafted PEG polymers and is available for reaction with other polymers and materials, thereby greatly increasing the utility of the PEG-grafted silicone polymer.

An exemplary synthesis of an amino-functionalized polyvinylsiloxane reactant, namely, 3-aminopropyl-terminated polydimethylvinylsiloxane (APT-PDMVS) is reported in Example I. A preferred synthetic method is anionic ring opening equilibration polymerization (ROEP). The starting materials are combined in the presence of a catalyst, for example benzyltrimethylammonium hydroxide, sodium hydroxide, potassium hydroxide and other bases under conditions and for a time sufficient to yield the functionalized polyvinylsiloxane.

In an alternative embodiment, where reactive functional end groups are not desired on the PEG-graft silicone polymer, the linear siloxane starting material does not include reactive functional end groups. Consequently, the resulting polyvinylsiloxane reactant does not contain reactive functional end groups, and the PEG-graft silicone polymer produced likewise does not contain reactive functional groups at the ends of the siloxane backbone.

It should accordingly be understood the invention thus includes a polyvinylsiloxane as described herein, as well as methods of making and using the polyvinylsiloxane. One use of the polyvinylsiloxane is as a reactant to form the PEG-grafted silicone polymer of the invention, but the polyvinylsiloxane has utility in other applications such as other chemical syntheses to form other useful polymers or copolymers.

The hydrophilic polymeric reactant is a hydrophilic polymer that has been functionalized to include a thiol group on one end, i.e., it is monothiolated. Any hydrophilic polymer can be used, including polyols, poly(meth)acrylic acids, polyacrylates, polyamines, polyammonium salts, polyethers, polyvinyl acids, polyvinyl alcohols, polyvinylpyrrolidones, poly(sulfobetaine)s, poly(carbobetaine)s and the like. An exemplary synthesis of a monothiolated hydrophilic polymeric reactant, namely thiol-terminated polyethylene glycol (PEG-SH) is reported the following examples. First, PEG was tosylated by contact with p-toluenesulfonyl chloride under conditions and for a time sufficient to yield the tosylated PEG. The tosylated PEG was then contacted with potassium thioacetate for a time and under conditions sufficient to yield PEG thioacetate. Finally, the PEG thioacetate was deprotected in the presence a weak base (ammonium hydroxide), and resulting disulfide bonds were reduced under conditions and for a time sufficient to yield the free thiol, PEG-SH.

It should accordingly be understood that the invention thus includes a monothiolated hydrophilic polymer as described herein, as well as methods of making and using the monothiolated hydrophilic polymer. One use of the monothiolated hydrophilic polymer is as a reactant to form the PEG-grafted silicone polymer of the invention, but the monothiolated hydrophilic polymer has utility in other applications such as other chemical syntheses to form other useful polymers or copolymers.

The amphiphilic silicone polymer, e.g., the silicone-PEG graft polymer, can be faulted by reacting the hydrophilic polymeric monothiol reactant, e.g., PEG-SH, with the polyvinylalklylsiloxane reactant. The polyvinylalkylsiloxane reactant is preferably a polyvinylmethylsiloxane having at least one, preferably two, reactive functional end groups, such as alkyl amino groups. Formation of the PEG-grafted silicone polymer product proceeds via a reaction between the thiol group of the hydrophilic polymeric reactant (e.g., PEG-SH) and the vinyl group of the polyvinylmethylsiloxane reactant. In the resulting amphiphilic polymer, the hydrophilic polymer is linked to the polysiloxane backbone through thioether linkage. These reactants, as well as their precursors, are also included in the invention.

Synthesis of a polydimethylsiloxane graft copolymer is illustrated in the scheme below where X, R, p and m are as defined above for the polyvinylsiloxane reactant; R' is aliphatic or aryl, substituted or unsubstituted; and Y is a hydrophilic polymeric group. An exemplary synthesis of a silicone graft polymer of the invention is also set forth in Example I.

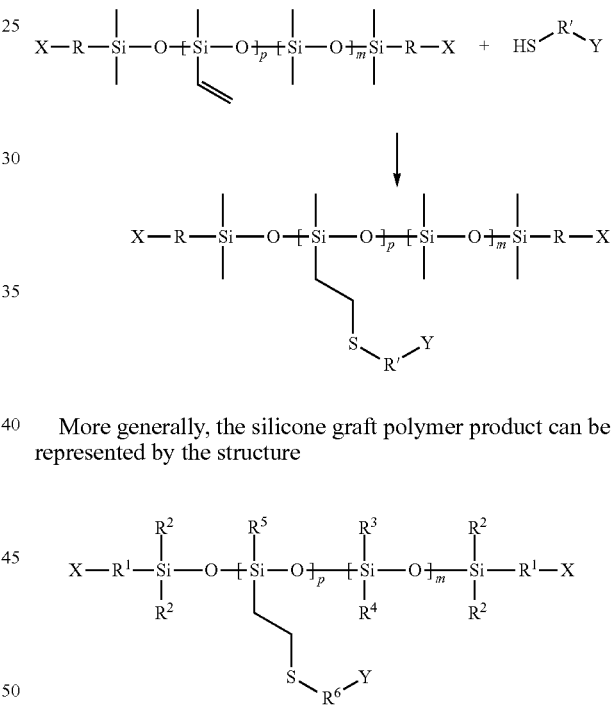

More generally, the silicone graft polymer product can be represented by the structure wherein $R^1$ is aliphatic or aryl, substituted or unsubstituted, preferably an alkyl such as methyl, ethyl, propyl and butyl; $R^2$ is alkyl such as methyl, ethyl, propyl and the like; $R^3$, $R^4$ and $R^5$ are each independently alkyl or substituted alkyl, such as methyl, vinyl, phenyl or trifluoropropyl; $R^6$ is aliphatic or aryl, substituted or unsubstituted; and X, Y, p and m are as defined above. Preferably, $R^3=R^4=R^5=$methyl. Formation of the PEG-grafted silicone polymer proceeds via a reaction between the thiol group of the hydrophilic polymeric reactant (in this case, PEG-SH) and the vinyl group of the polyvinylmethylsiloxane reactant. In one embodiment, the method involves combining the reactants in a solvent, such as tetrahydrofuran, the presence of a free radical-generating catalyst or initiator, such as benzoyl peroxide, di-t-butyl peroxide, t-butyl peroctoate, t-amyl-peroxy-2-ethyl hexanoate, hydrogen peroxide, potassium or ammonium peroxydisulfate, dibenzoyl peroxide, lauryl peroxide, 2,2'-azobisisobutyronitrile, t-butylperoxide, t-butyl hydroperoxide, 2,2'-azobis(2-methylbutyronitrile) for a time and under conditions to yield the PEG-grafted silicone polymer product.

The PEG-SH is typically used at either a stoichiometric equivalent amount or, in some embodiments, in a molar excess of 10 to 100% to avoid side reactions. In other embodiments, however, it may be desirable to use PEG-SH in less than stoichiometrically equivalent amounts in order to limit the number/amount of hydrophilic polymer in the resulting graft polymer.

More generally, control over the surface coverage of the hydrophilic side chains grafted onto the siloxane backbone can be exerted in a number of ways during the synthetic process, such as by varying the number of vinyl groups on the vinylated siloxane reactant, by varying the length or composition of the hydrophilic polymer chain, and/or by providing the hydrophilic polymeric monothiol in limiting quantities such that vinyl groups on the polyvinylsiloxane reactant are in molar excess of the thiol groups on the monothiol reactant. In the latter case, the resulting graft polymer may contain unreacted vinyl groups. Thus, depending on the amount of hydrophilic polymer surface coverage desired, the nature of the functional end groups, if any, and the intended use of the resulting graft polymer, the molar ratio of thiol to vinyl used during synthesis of the amphiphilic polymer can vary from about 5:1 to about 0.1:1, and anywhere in between, such as, for example, 2:1, 1.5:1, 1.1:1, 1:1, 0.9:1, 0.8:1, 0.5:1, and 0.1:1.

As used herein, the term "aliphatic" or "aliphatic group" means a saturated or unsaturated linear (i.e., straight chain), cyclic, or branched hydrocarbon group. This term is used to encompass alkyl (e.g., —$CH_3$) (or alkylene if within a chain such as —$CH_2$—), alkenyl (or alkenylene if within a chain), and alkynyl (or alkynylene if within a chain) groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "aromatic group" or "aryl group" means a mono- or polynuclear aromatic hydrocarbon group. These hydrocarbon groups may be substituted with heteroatoms, which can be in the form of functional groups. The term "heteroatom" means an element other than carbon (e.g., nitrogen, oxygen, sulfur, chlorine, etc.).

Polyurethanes

A further aspect of the invention includes the incorporation of the functionalized amphiphilic silicone polymer, such as the PEG-grafted siloxane, into a polyurethane to generate a coating which is resistant to biofouling.

A curable crosslinked polyurethane coating system can be prepared by mixing the functional PEG-grafted siloxane with an polyol (e.g., 80% butyl acrylate, 20% 2-hydroxyethyl acrylate prepared by solution polymerization) and a polyisocyanate (e.g., Tolonate IDT 70B, a triisocyanurate resin from isophorone diisocyanate, commercially available from Perstorp), casting the coating formulation on a substrate and effecting curing. In general, the functional PEG-grafted siloxane copolymer is used in the coating at an amount ranging from about 1 to about 50 percent by weight. General methods for polyurethane synthesis are described, for example, in U.S. Pat. No. 7,989,074.

Any polyol is suitable in the polyurethane coating formulation including polyester, polyether, polycarbonate, and acrylic polyols. Other suitable polyols include polycaprolactone triol, glycerol, alkylene glycols (e.g., ethylene glycol, diethylene glycol, triethylene glycol and neopentylglycol), pentaerythritol, trimethylolethane, trimethylolpropane, sorbitol, cyclohexanediols, inositol, and polyglycerol.

Any polyisocyanate is suitable for use in the formation of the polyurethane coating including aromatic, cycloaliphatic and aliphatic isocyanates. Many isocyanate functionalized compounds are available commercially, but their exact composition is protected as a trade secret. Examples of suitable isocyanate functionalized compounds include alkyl diisocyanates and cycloalkyl diisocyanates such as isophorone diisocyanate, 1,6-hexamethylene diisocyanate, methylene dicyclohexyl diisocyanate, xylylene diisocyanate, trans-1,4 cyclohexane diisocyanate, tetramethyl xylylene diisocyanate, isopropenyl dimethylbenzyl diisocyanate, trimethylhexamethylene diisocyanate, 2,2,4-(2,4,4)trimethylhexamethylene diisocyanate, ethylene diisocyanate, 1,4-tetramethylene diisocyanate, 1,12-dodecane diisocyanate, cyclobutane-1,3 diisocyanate, cyclohexane-1,3 diisocyanate, cyclohexane-1,4 diisocyanate, 1-isocyanato-3,3,5-trimethyl-5-isocyanoatom-ethyl cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, and norbornane diisocyanate and polyisocyanates such as isophorone diisocyanate trimer (available commercially as Tolonate IDT-70B, a product of Perstorp and as Desmodur Z4470, a product of Bayer AG), hexamethylene diisocyanate trimer (available commercially as Tolonate AT, a product of Perstorp and as Desmodur N3390, a product of Bayer AG), and biurets and allophanates based on the diisocyanates. Aliphatic and cycloaliphatic isocyanates are preferred. These include the isocyanurate and biuret trimer resins of 1,6-hexamethylene diisocyanate and isophorone diisocyanate.

Solvents are also used in the coating formulations of the invention. Aliphatic or aromatic, ketones, alcohol, and ester solvents are suitable for use. Dipolar aprotic solvents such as N,N-dimethyl formamide, N,N-dimethyl acetamide, and N-methyl pyrrolidone can be used. A mixture of solvents is also suitable for use in the invention. In addition, a catalyst may also be used in the coating formulation to catalyze the curing reaction. Typical catalysts include tin catalysts such as dibutyl tin dilaurate, dibutyl tin diacetate (DBTDAc) and amine catalysts such as DABCO [1,4-diazabicyclo[2.2.2]octane]. A pot life extender can also be used in the coating formulation to slow down the curing reaction until the coating is applied to the substrate. A typical pot life extender is 2,4-pentanedione.

An exemplary polyurethane is shown below:

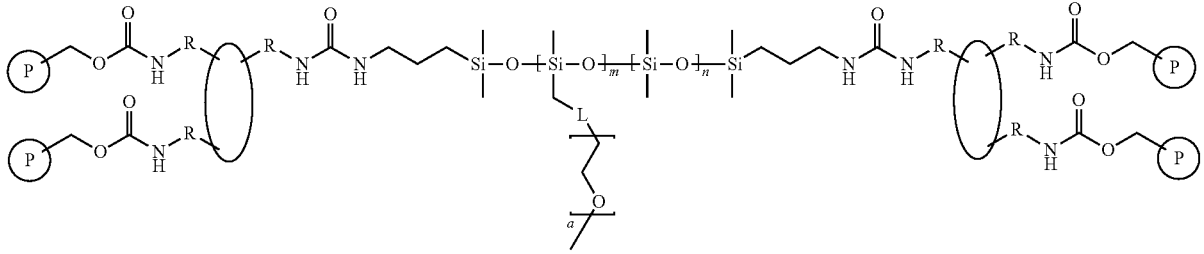

wherein L is a linking group, which preferably includes a thioether; the R groups are independently aliphatic or aryl groups, substituted or unsubstituted; wherein n can range from 0 to 2000 and is preferably 5 to 1000; and m can range from 1 to 2000 and is preferably 2 to 1000; and the letter "P" in the circle ○ is a polyol; and the large circle is polyisocyanate.

EXAMPLES

The present invention is illustrated by the following examples. It is to be understood that the particular examples, materials, amounts, and procedures are to be interpreted broadly in accordance with the scope and spirit of the invention as set forth herein.

Introduction

Siloxane polymers with terminal amine functionality and pendant PEG chains were synthesized. Briefly, equilibration polymerization of two cyclic siloxane monomers, octamethylcyclotetrasiloxane ($D_4$) and 1,3,5,7-tetramethyl-1,3,5,7-tetravinylcyclotetrasiloxane ($D_{4V}$) was carried out, after which thiol terminated PEG chains were added across pendant vinyl groups using thiol-ene click chemistry.

The PEG grafted siloxane polymers were characterized by NMR and GPC. The polymers were then incorporated into a thermoset polyurethane (PU) system and the coatings were characterized for their surface properties using water contact angle (WCA), Confocal Raman microscopy (CRM), and Attenuated Total Reflection-Fourier transform Infrared (ATR-FTIR) spectroscopy. The fouling-release performance of the coatings was tested in the laboratory using a suite of relevant marine fouling organisms.

The novel siloxane-PEG copolymers have terminal amine functionality and a backbone of siloxane having a varied number of pendant hydrophilic PEG chains. The synthetic approach involves the precise control over the number of hydrophilic PEG chains, siloxane and PEG chain lengths, and terminal amine functionality. The density of PEG chains on the surface can be varied by changing the number of pendant vinyl groups.

Additionally, the functional polymers can be incorporated into a polyurethane system to affect the surface properties. The low surface energy siloxane can aid in bringing PEG chains to the surface and the terminal amine functionality can react with polyurethane. Therefore, the surface of the material will be amphiphilic while the underneath PU bulk will give toughness to the system. The synthetic approach involves precise control over the number of hydrophilic PEG chains, siloxane and PEG chain lengths, and terminal amine functionality for further reaction. The amount of surface coverage by PEG chains can be varied by changing the number and amount of pendant PEG chains.

A siloxane-PEG copolymer with terminal amine functionality and pendant PEG chains is represented in this schematic showing a backbone of siloxane polymer with terminal amine functionality and pendant PEG chains:

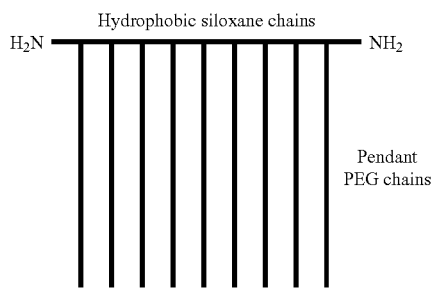

Materials and Methods

Chemicals

3-Aminopropyl-terminated poly(dimethylsiloxane) number average molecular weight (Mn) 875 g/mole (APT-PDMS-875), bis(3-aminopropyl)-tetramethyldisiloxane (BAPT-MDS), octamethylcyclotetrasiloxane ($D_4$) 1,3,5,7-tetramethylcyclotetrasiloxane ($D_{4H}$) and 1,3,5,7-tetramethyl-1,3,5,7 tetravinylcyclotetrasiloxane ($D_{4V}$) were purchased from Gelest Inc. Benzyltrimethyl ammonium hydroxide (40% in methanol), platinum(0)-1,3-divinyl-1,1,3,3-tetramethyldisiloxane complex solution in xylene, Pt ~2% (Karstedt's catalyst), methoxypolyethylene glycol Mn 350 g/mole (MPEG 350), potassium thioacetate, sodium borohydride, lithium aluminum hydride, n-Butyl acrylate (BA) and 2-hydroxyethyl acrylate (HEA) were purchased from Aldrich. Methanesulfonic acid was purchased from Alfa Aesar and p-toluenesulfonyl chloride was purchased from Acros Organics. The initiator 2-azobis(2-methylbutanenitrile) (Vazo 67) was kindly provided by Dupont. Polyethylene glycol allylmethyl ether (Polyglykol AM 350) was kindly provided by Clariant. Ammonium hydroxide (28-30% ammonia by volume), anhydrous toluene, anhydrous tetrahydrofuran (THF), methanol, dimethylformamide (DMF), dichloromethane, toluene and hexane were obtained from VWR. All reagents were used as received.

An acrylic polyol composed of 80 percent butyl acrylate and 20 percent hydroxyethyl acrylate was synthesized using free radical solution polymerization as described in U.S. Pat. No. 7,989,074.

Synthesis of Siloxane-PEG Copolymer:

APT-PDMVS of Mn 10,000 g/mole having 1:1 mole ratio of $D_4$ and $D_{4V}$ (1 g, 0.1 mmole, average of 52.89 eq. vinyl groups per mole), THF 4.5 mL, dichloromethane 4.5 mL, SH-PEG (6.5 g, 17.90 mmole) and Vazo 67 (300 mg) was weighed into a 2-neck 250 ml round bottom flask equipped with condenser, magnetic stirrer and $N_2$ inlet. The flask was heated to 80° C. in an oil bath. The reaction was monitored by $^1$H NMR for the complete disappearance of vinyl peaks. Then, the reaction mixture was cooled to room temperature and concentrated. Excess SH-PEG was removed by extracting the reaction mixture with cold hexane and THF several times. The polymer was collected, concentrated and dried in vacuo at room temperature overnight.

Characterization Methods

Polymer Characterization:

$^1$H NMR measurements were done using a JEOL-ECA 400 (400 MHz) NMR spectrometer. $^1$H NMR of APT-PDMVS was done in $CDCl_3$. $^1$H NMR of the functional siloxane polymer was done in 80% $CDCl_3$/20% methanol-d by volume. High-throughput GPC was performed on siloxane polymers using a Symyx Rapid GPC with an evaporative light scattering detector (PL-ELS 1000), equipped with 2×PLgel Mixed-B columns (10 μm particle size) at 45° C. Solutions of 2 mg/mL sample in THF were prepared before run and amine functional siloxane polymers were derivatized with acetic anhydride to avoid adsorption on column. Polystyrene standards were used for calibration and determination of relative molecular weight.

Coatings Characterization:

A Symyx surface energy system was used for SE analysis. Each coating was tested with three water droplets and three methylene iodide (MI) droplets. Image analysis was used to determine the contact angles of the liquid droplets. The Owens-Wendt method was then used to calculate the SE of the coatings. Owens et al., J. Appl. Polym. Sci. 1969 13(8): 1741-7.

Confocal Raman spectra were recorded on a JOBIN Yvon Horiba Raman Spectrometer model HR800 using a Synapse charge-coupled detection (CCD) System with 532 nm laser excitation. All data were processed using NGSLabSpec 5.2 (JY Horiba) software. Z depth profiling used a 50 NA=0.75, Olympus Objective. The depth profiling experiment was started by taking a spectrum at the surface of the film, then taking a profile from −100 μm to +100 μm, with the surface being 0 in increments of 10 μm creating a profile of twenty one spectrums with ten above and below the surface and one at the surface. The Raman spectra were collected over the range of 400 cm$^{-1}$ to 4000 cm$^{-1}$. An ATR-FTIR spectrum of thin film of coating was obtained using a Bruker Vertex 70 with Harrick's ATR™ accessory using a hemispherical Ge crystal.

A Dimension 3100® microscope with Nanoscope IIIa controller (Digital Instruments, Inc., California) was used for Atomic Force Microscope (AFM) measurements. Surface scans were done in tapping mode in air at ambient conditions with silicon probes with a spring constant 0.1-0.4 N/m and resonant frequency 17-24 kHz. Topographical images of 20 μm 20 μm are obtained. A Veeco NT3300 non-contact optical profiler was used for optical imaging of the surfaces. The measurements were done in phase shifting interferometry (PSI) mode.

Water Ageing:

The coatings applied in 24-well plates and on panels were pre-leached in a water tank. The water was filtered with treated carbon to reduce the chloramine level from ~4 ppm to <0.1 ppm. In addition to a continuous flow of filtered water, the tank was automatically emptied and filled every hour to increase the leaching effect.

Biological Evaluation Methods

Growth and Release of *Ulva* Sporelings:

Samples (24-well plates) that had been pre-leached for 28 days at NDSU were shipped to the University of Birmingham, UK. Prior to the bioassay, the plates were equilibrated in de-ionized water for 48 h followed by artificial seawater (ASW) for 2 hours. Fouling-release performance of the coatings towards sporelings (young plants) of the green macroalga, *Ulva* was evaluated. Briefly, zoospores were released from fertile plants and the concentration of spores adjusted to 5×10$^5$ spores ml$^{-1}$. Spores that settled (attached) on the plates were grown for 6 days inside an illuminated incubator at 18° C. with a 16:8 light:dark cycle (photon flux density 45 μmol·m$^{-2}$·s$^{-1}$) with renewal of nutrients every 48 hours. After 6 days growth, the plates were sprayed at 18, 43 or 89 kPa impact pressure delivered from a water jet. For each plate, one row (6 replicates) was left untreated and three rows were sprayed, one at each impact pressure giving 6 replicates per pressure. Therefore, three different water jet impact pressures were used to study the release properties of sporelings from the coating surfaces. Biomass was determined by extraction of chlorophyll as described for *Navicula incerta* below. Percentage removal was calculated from the mean chlorophyll concentration before (i.e. the unsprayed wells), and after water-jetting.

*Navicula incerta* Cell Attachment and Adhesion:

Coatings (24-well plates) were inoculated with 1.0 mL of *N. incerta* re-suspended to 4 10$^5$ cells·ml$^{-1}$ in Guillard's F/2 medium. The plates were incubated statically for 2 hours on the laboratory bench at room temperature to facilitate cell attachment. Three replicate wells, for each coating composition, were not treated with the water-jet and were used to measure the initial amount of cells attached to each coating surface. An additional three replicate wells were treated with the water-jet apparatus at 43 kPa and 80 kPa impact pressure for ten seconds. Algal cell biomass was quantified by the fluorescence of chlorophyll a, which was extracted with 0.5 mL of dimethyl sulfoxide by placing the plates in a dark cabinet for 30 minutes. 0.2 mL of the resulting eluates was transferred into 96-well plates and the fluorescence was measured using a multi-well plate spectrophotometer (Excitation wavelength: 360 nm; Emission wavelength: 670 nm). Fluorescence was recorded as Relative Fluorescence Units (RFU). Percentage removal was calculated from the mean chlorophyll concentration before and after water-jetting.

Bacterial Biofilm Adhesion:

Coating array plates were inoculated with 1.0 mL of the appropriate marine bacterium, *H. pacifica* or *C. lytica*, resuspended in sterile nutrient growth medium (40 g of Sigma sea salts, 0.5 g of dextrose (*H. pacifica*) or peptone (*C. lytica*), 0.1 g of yeast extract per liter of deionized water), at ~10$^{-7}$ cells·ml$^{-1}$. Plates were incubated statically at 28° C. for 24 hours and then transferred to the deck of an automated water-jet apparatus. Three replicate wells, for each coating composition, were not treated with the water-jet and were used to measure the initial amount of biofilm retained on each coating surface. An additional three replicate wells were treated with the water-jet apparatus at a 43 kPa and 80 kPa impact pressure for five seconds. After water-jet treatments, the plates were stained with 0.5 mL of crystal violet, rinsed three times with deionized water and allowed to dry at ambient laboratory conditions for 1 hour. Digital images were captured of each coating array plate after crystal violet staining and 0.5 mL of 33% acetic acid was then added to each well to solubilize the crystal violet retained in the adherent biofilm on the coating surfaces. Eluates (0.2 mL) from each well were transferred to a 96-well plate and measured for absorbance at 600 nm with a multi-well plate spectrophotometer. Percentage removal was calculated from the mean crystal violet absorbance value before and after water-jetting.

Reattached Barnacle Adhesion:

An adult barnacle reattachment assay was utilized to gauge the fouling-release performance of the coatings with respect to shell fouling. Adult barnacles (*Amphibalanus amphitrite*) with a basal diameter of approximately 5 mm were removed from a silicone substrate and placed on the coating panels. Nine barnacles were used for testing each coating. The barnacles were allowed to reattach to the coating surfaces by immersing the panels in an ASW aquarium system for 14 days with daily feedings of brine shrimp nauplii. The reattached barnacles were dislodged from the coating surfaces using a hand held digital force gauge in accordance with ASTM D5618-94. A digital force gauge was placed at the barnacle base plate, parallel to the coating surface, and pushed laterally (i.e., in shear) until it became detached from the surface. Once detached, the areas of the barnacle base plates were measured using image analysis (Sigma Scan Pro5.0). Barnacle adhesion strengths were calculated from the removal force and the area of the barnacle base plates. The adhesion values for each coating were reported as the mean of the total number of barnacles exhibiting a measurable removal force.

Example I

Synthesis and Characterization of 3-Aminopropyl-Terminated Polydimethylvinyl Siloxane (APT-PDMVS)

Vinyl functional APT-PDMVS was synthesized using $D_4$, $D_{4V}$ and APT-PDMS-875. See Bodkhe et al., Prog. Org. Coatings 75, 38-48 (2012). In one experiment, APT-PDMVS polymer having Mn 10000 g/mole was synthesized by anionic ring opening equilibration polymerization (ROEP) of $D_4$ and $D_{4V}$. Catalyst benzyltrimethyl-ammonium hydroxide was added to $D_4$ and methanol was removed using a rotary evaporator. Catalyst concentration was 0.1% on monomer. Rotovapped $D_4$ solution, $D_{4V}$ and APT-PDMS-875 as end blocker were equilibrated for 48 hrs at 80° C. in a 250 ml 2-neck flask in the presence of nitrogen with magnetic stirring and. Then, the polymer was heated to 170° C. for 45 minutes to decompose the catalyst. The clear polymer obtained was characterized for $^1$H NMR and GPC.

3-aminopropyl-terminated polydimethylvinyl siloxane (APT-PDMVS) polymers having Mn of 5000 and 10,000 g/mole 1:1 mole ratios of $D_4$ and $D_{4V}$ and APT-PDMS-875 as end blocker were synthesized. The polymers were equilibrated for 48 hrs at 80° C. in 250 ml two neck flask equipped with condenser, nitrogen inlet and magnetic stirrer. After this time, the polymers were heated to 170° C. for 45 minutes to decompose the catalyst.

The polymers were characterized using proton NMR and GPC. The $^1$H NMR showed methylene protons attached to terminal silicone atom resonating at 0.5, 1.4 and 2.65 ppm as well as vinyl peaks resonating at ~6.0 ppm, indicating formation of APT-PDMVS. The $^1$H NMR molecular weight determination was done by comparing the integral of methylene protons attached to terminal silicone atom with the vinyl protons resonating at ~6.0 ppm. The viability of APT-PDMVS synthesis for various molecular weights was verified by carrying out various synthesis reactions changing the mole ratio of $D_4$ to $D_{4V}$. The target values were obtained as shown in Table 1. Good agreement between Mn values determined from $^1$H NMR and GPC was obtained for APT-PDMVS. Therefore, control over siloxane chain length with terminal amine functionality and number of pendant vinyl groups was achieved.

TABLE 1

Molecular Weights of APT-PDMVS using GPC & $^1$H NMR.

| Sr. No. | Moles of $D_4$ | Moles of $D_{4V}$ | Target Mn g/mole | GPC Mn g/mole; PDI | $^1$H NMR g/mole |
|---|---|---|---|---|---|
| 1 | 75 | 25 | 5000 | 6800; 1.63 | 6000 |
| 2 | 50 | 50 | 5000 | 6900; 1.62 | 6000 |
| 3 | 75 | 25 | 10000 | 12100; 1.64 | 10700 |
| 4 | 50 | 50 | 10000 | 11700; 1.67 | 11100 |
| 5 | 90 | 10 | 20000 | 20500; 1.64 | 20200 |
| 6 | 70 | 30 | 20000 | 20400; 1.64 | 21500 |

Example II

Synthesis of Thiol Terminated PEG (SH-PEG)

Synthesis of SH-PEG is multistep process and, under typical synthetic conditions an active thiol group can form product with poor purity. Therefore, the important step in this synthesis approach involves preparation of thiol-terminated PEG since the commercial price of SH-PEG is very high and literature regarding its synthesis is limited (Wan et al., *Reac. & Func. Polym.* 2008 68:431-435). The synthesis of SH-PEG is shown in Scheme 2. The hydroxyl PEG was tosylated with P-toluene sulfonylchloride to form the tosylated PEG which was subsequently changed to thioacetate terminated PEG by displacing the tosyl group. The hydrolysis of thioacetate PEG yield SH-PEG with 87% purity. The higher purity PEG was not desirable in this case since excess PEG used in thiol-ene reaction as well as non-functionalized PEG was extracted using THF and cold hexane. $^1$H NMR spectra of synthesis of SH-PEG showed the peaks expected to be present in the product of each step during SH-PEG synthesis. The synthesis of SH-PEG was also continued by GPC analysis. Good agreement between target and obtained values was found.

The synthesis of SH-PEG is shown in Scheme 1 below and is carried out in three steps.

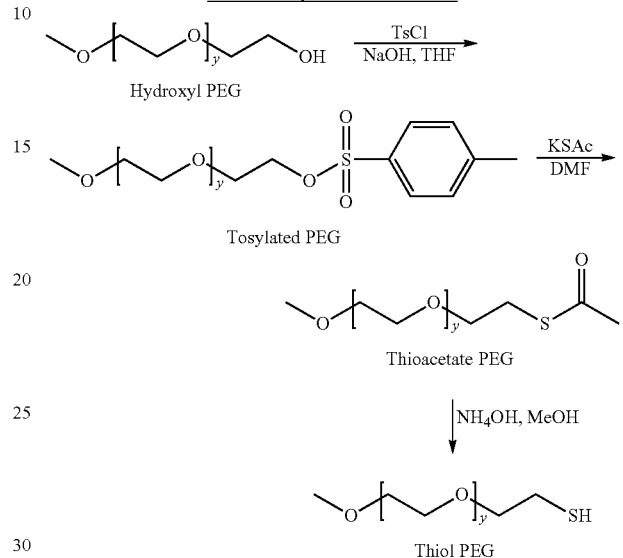

Scheme 1. Synthesis of SH-PEG.

(A) Tosylation of PEG

NaOH (16 g, 0.4 mole) was dissolved in 80 mL of water and added to an ice-cooled solution of MPEG 350 (98 g, 0.28 mol) in 80 g THF in a 3-neck 500 ml flask. p-Toluenesulfonyl chloride (60 g, 0.31 mole) was mixed in 70 g of THF and was added dropwise to the ice-cooled solution over 2 hours in the presence of nitrogen with magnetic stirring. The reaction was further run for two hours. The reaction mixture was poured into an ice-water mixture and extracted with dichloromethane (200 ml×2). The organic extract was washed with water (200 ml×2) and brine solution and then dried over anhydrous magnesium sulfate. The solvent was removed and the clear solution obtained was vacuum dried overnight at 60° C.

(B) Displacement with Thioacetate

Potassium thioacetate (8.55 g, 0.075 mol) was mixed with 265 g DMF and the tosylated PEG (30 g, 0.06 mol) was added. The mixture was stirred at room temperature for three days. After this, DMF was removed on a rotary evaporator and the residue was dissolved in 200 mL of water and extracted with dichloromethane (200 ml×3), dried over magnesium sulphate, filtered, treated with charcoal, and concentrated under vacuum to remove solvent. The brown oil obtained was vacuum dried at 60° C. overnight.

(C) Deprotection to Thiol 20 g of the PEG thioacetate (step B) was mixed with 95 g of ammonium hydroxide (28-30% ammonia by volume) and 400 g of methanol. The reaction mixture was stirred at room temperature for 5 hours and then methanol was removed, extracted with dichloromethane, dried over magnesium sulphate, and dichloromethane was removed. The product obtained was dried in vacuum oven for overnight at 60° C. The hydrolysis of thioacetate PEG yield SH-PEG with 87% purity. $^1$H NMR showed the peaks expected to be present in the product of each step during SH-PEG synthesis. The synthesis of SH-PEG was also confirmed by GPC analysis. GPC results are represented in Table 2. Good agreement between target and obtained values was found.

TABLE 2

Molecular Weight of SH-PEG using GPC

| Sr. No. | PEG | Target Mn g/mole | GPC Mn g/mole; PDI |
|---|---|---|---|
| 1 | Tosylated PEG | 500 | 540; 1.11 |
| 2 | Thioacetate PEG | 400 | 400; 1.11 |
| 3 | Thiol PEG | 365 | 416; 1.12 |

Example III

Synthesis of Siloxane-PEG Copolymer

In the next step, SH-PEG was added across the siloxane backbone via click chemistry. Thiol-ene reactions falls under the category of "Click reactions" due to their characteristics of rapid reaction rates, requiring small amount of catalyst, high yield, insensitivity of oxygen or water, and yielding a single regioselective product. Use of thiol-ene reactions can overcome drawbacks associated with other synthetic methods, such as hydrosilylation. Siloxane polymer having terminal amine groups and pendant silyl-vinyl groups were synthesized (see Example I) and then, thiols of the SH-PEG were added across silyl-vinyl groups to graft PEG chains. The propagation of double bond was avoided using excess SH-PEG which was removed after the reaction by extraction with THF and cold hexane. The pendant vinyl groups on the siloxane backbone represent the ideal structure to obtain a functional copolymer since these vinyl groups do not polymerize in free radical reactions.

Synthesis of the siloxane having PEG grafted side chains is shown in Scheme 2 below.

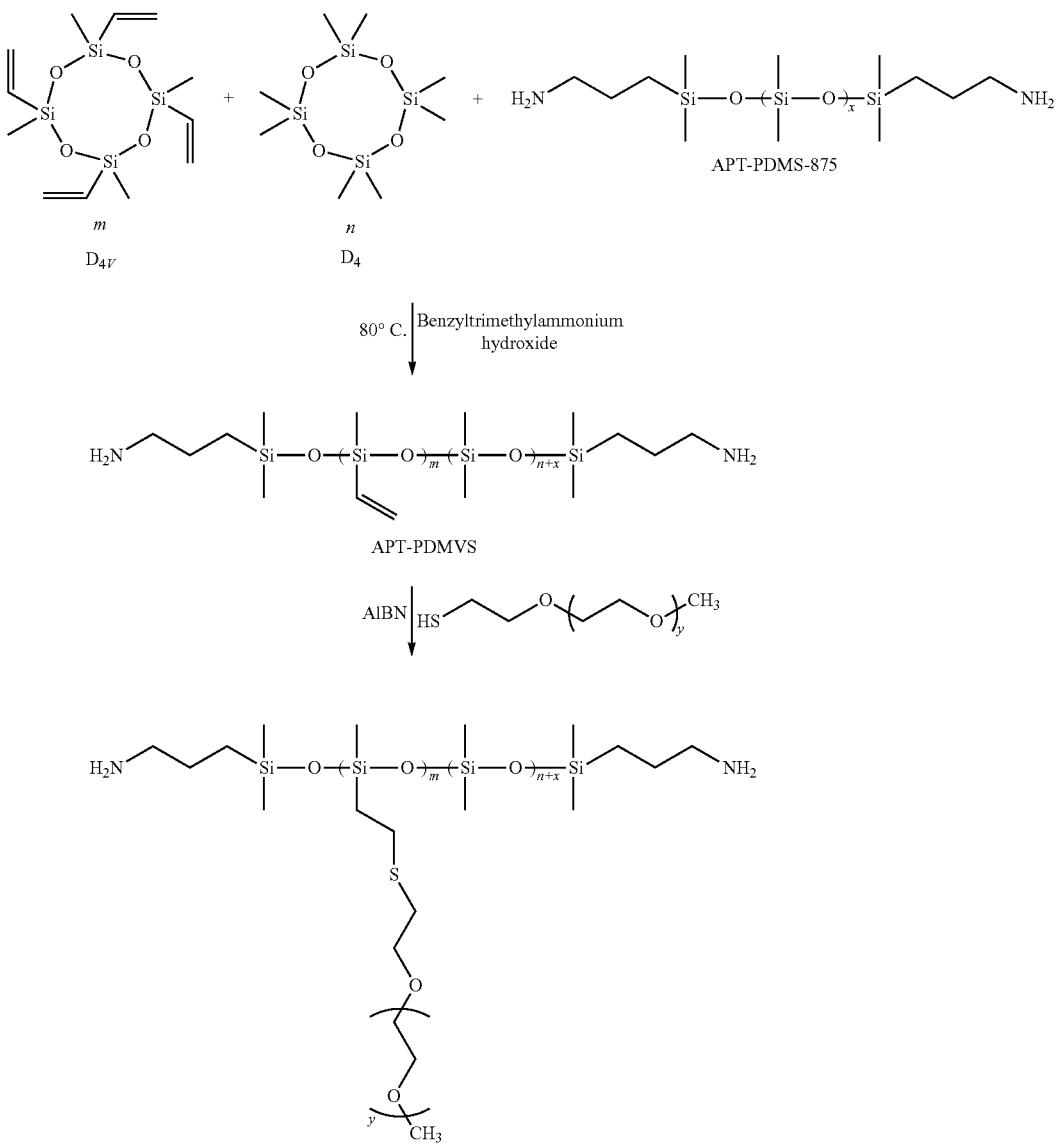

Scheme 2. Synthesis of siloxane polymer having pendant PEG brush using thiol-ene chemistry.

In a typical example, APT-PDMVS of Mn 10,000 g/mole from Example 1 having 1:1 mole ratio of $D_4$ and $D_{4V}$ (1 g, 0.1 mmole, average of 52.89 eq. vinyl groups per mole), THF 4.5 mL, dichloromethane 4.5 mL, SH-PEG (6.5 g, 17.90 mmole) from Example 2 and catalyst 2-azobis(2-methylbutanenitrile) (300 mg) was weighed into a 2-neck 250 ml round bottom flask equipped with condenser, magnetic stirrer and $N_2$ inlet. The flask was heated to 80° C. in an oil bath. The reaction was monitored by $^1$H NMR for the complete disappearance of vinyl peaks. Then, the reaction mixture was cooled to room temperature and concentrated. Excess SH-PEG was removed by extracting the reaction mixture with cold hexane and THF several times. The polymer was collected, concentrated and dried in vacuo at room temperature overnight.

The thiol-ene reactions were monitored using $^1$H NMR for the disappearance of protons from the vinyl double bond. The $^1$H NMR for the siloxane PEG copolymer indicated the disappearance of the peaks corresponding to vinyl and thiol protons and formation of intense peak at 0.8 ppm and 2.4-2.5 ppm corresponding to methylene protons attached to Si indicated successful formation of siloxane with pendant PEG chains. The spectrum was dominated by protons of PEG chains due to its higher concentration compared to the end blocker.

During the thiol-ene reaction, the excess PEG was used which was detected in GPC analysis after completion of reaction. However, extraction of reaction product with THF and cold hexane successfully removed the excess SH-PEG used in the reaction. GPC values for siloxane PEG copolymers are represented in Table 3. GPC values for polymers with 1:1 mole ratio of $D_4$ to $D_{4V}$ was in very good agreement with target values. Therefore, GPC and NMR characterization methods showed that the siloxane PEG copolymers were synthesized successfully.

TABLE 3

Molecular Weights of siloxane PEG copolymer using GPC.

| No. | Moles of $D_4$ | Moles of $D_{4V}$ | Mn of APT-PDMVS g/mole | Target Mn of Siloxane PEG copolymer | GPC Mn g/mole; PDI |
|---|---|---|---|---|---|
| 1 | 50 | 50 | 5000 | 13700 | 17500; 1.41 |
| 2 | 50 | 50 | 10000 | 29500 | 30,000; 1.30 |

Example IV

Preparation of PDMS-PEG Containing Polyurethane Coatings

The PEG grafted siloxane polymers (35% in butyl acetate) from Example III, acrylic polyol (75% in toluene), and 2,4-pentanedione were mixed with magnetic stirring in a 4 ounce glass jar overnight. The next day, IDT (70% in butyl acetate) and catalyst DBTDAc (1% in MAK) were added. The mole ratio of isocyanate to amine plus hydroxyl was kept at 1.1:1. The 2,4-pentanedione and catalyst were added at 10% and 0.04% on total solid of mixture, respectively. Drawdowns were made after 1-2 hours of vigorous mixing using magnetic stirring. Coatings for bacterial and algal analysis were prepared by depositing 0.25 ml of each coating solution using a pipette into a 24-well plate modified with epoxy primed aluminum discs. The evaluation of reattached adult barnacle adhesion was carried out using drawdowns. The coatings were cured at room temperature overnight in a dust free cabinet and next day, cured at 80° C. for 45 minutes in an oven for complete curing. Control coatings containing 3-aminopropyl terminated PDMS (APT-PDMS, 20,000 g/mole) (no PEG grafts) were prepared in a similar manner except that the APT-PDMS was used without further dilution and acrylic polyol with 50 weight % in toluene was used.

Characterization of PDMS-PEG Coatings

The siloxane-PEG copolymers were incorporated into a polyurethane coatings system. The coating system was comprised of the amine terminated siloxane-PEG copolymer, acrylic polyol, pot life extender, isocyanate crosslinker, and catalyst. The coating identities are shown in Table 4. 5K-50% PEG-10% represents an APT-PDMVS coating with 5000 g/mole molecular weight with 50% PEG chains and added at 10 weight % in the siloxane-polyurethane coating. Therefore, 5K-50% PEG-10% contains the lowest PEG content and 10K-50% PEG-20% contains the highest PEG content in the series. The siloxane-PEG coatings were compared with a siloxane-polyurethane coating based on 3-aminopropyl terminated PDMS (APT-PDMS). 20K-D-20% represents a coating having APT-PDMS of 20,000 g/mole and 20 weight %.

TABLE 4

The APT-PDMS based siloxane-polyurethane coating IDs.

| Coating ID | Moles of $D_4$ | Moles of $D_{4V}$ | Mn of APT-PDMVS (g/mole) | % Weight content in coating |
|---|---|---|---|---|
| 5K-50% PEG-10% | 50 | 50 | 5000 | 10 |
| 5K-50% PEG-20% | 50 | 50 | 5000 | 20 |
| 10K-50% PEG-10% | 50 | 50 | 10,000 | 10 |
| 10K-50% PEG-20% | 50 | 50 | 10,000 | 20 |
| 20K-D-20% | 100 | 0 | 20,000 | 20 |

Figure 3:
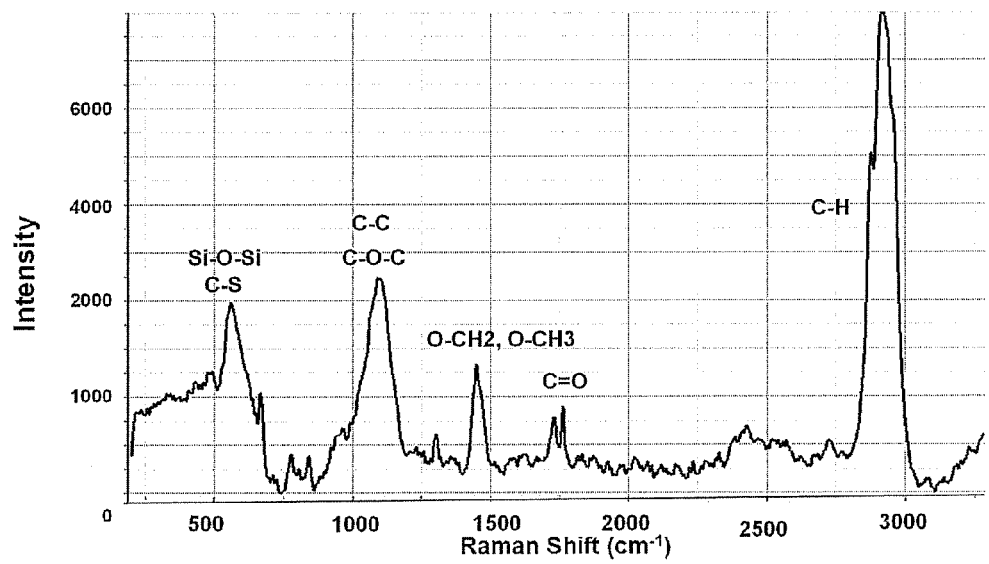
FIG. 3 shows a confocal Raman spectrum of surface of 10K-50% AF-20% coating showing the presence of Si—O—Si, C—S and PEG groups on the surface.

To study whether the PDMS along with the PEG are present at the surface, coatings were characterized using CRM, ATR-FTIR, and WCA. The surface of solvent cast coating system contains lowest SE component. The self-stratification in siloxane-polyurethane system makes the surface enriched with siloxane due to its low SE. Therefore, to study the presence of siloxane-PEG copolymer on the surface, the surface profile of the coating was studied using CRM. Many applications demonstrate that CRM is a non-destructive technique to study the composition as a function of depth of polymer films and coatings. The Raman spectrum of coating 10K-50% PEG-20 is shown in FIG. 3.

The strong intensity peak for Si—O—Si, C—S as well as a strong C—C, C—H, C—O—C, O—CH$_2$ stretching confirmed the presence of siloxane-PEG copolymer on the surface. The C═O stretch at 1750 cm$^{-1}$ may be from acrylic polyol or carbamate. Therefore, polyisocyanate and polyol might also be present on the surface along with the acid functional siloxane polymer.

Figure 4:
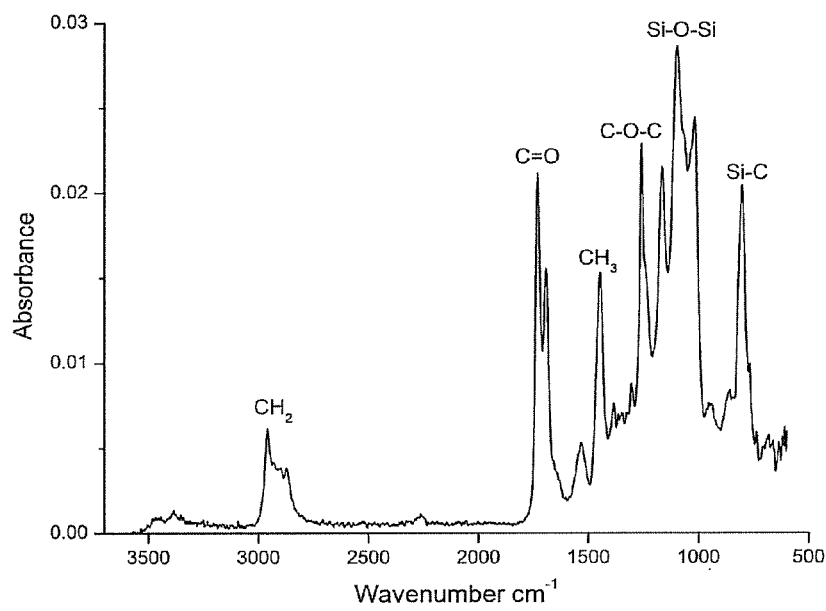
FIG. 4 shows an ATR-FTIR spectra of coating 10K-50% AF-20%.

Similarly, the ATR-FTIR spectrum of coating 10K-50% PEG-20% is shown in FIG. 4. The characteristic peaks of Si—O—Si, C—O—C and Si—C in ATR-FTIR confirms the presence of the siloxane polymer along with PEG chains at the surface. However, the shoulder for the carbonyl peak indicates the presence of more than one type of carbonyl near the surface. It may be likely that the shoulder for the C═O peak is from acrylic polyol or carbamate or both. Therefore, polyol and polyisocyanate might be present near the surface along with the siloxane-PEG copolymer. The absence of a peak at 2500 cm$^{-1}$ for S—H in Raman and ATR-FTIR spectra indicates that excess SH-PEG used in the thiol-ene reaction was successfully removed during extraction as seen by GPC and $^1$H NMR as well.

Figure 5:
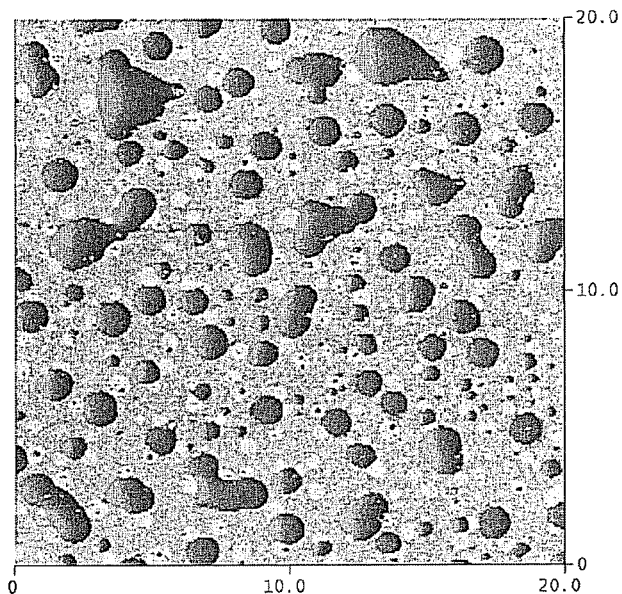
FIG. 5 shows surface topography of 10K-50% PEG-20% coating made using drawdown. The image size is 20×20 μm.

Similarly, surface topography of 10K-50% PEG-20% coating was characterized using AFM as shown in FIG. 5. Interestingly, AFM image showed three distinct phases which can be attributed to siloxane, PEG and polyurethane. Therefore, the surface topography shows the presence of different phases on the surface corresponding to the different components of the coating.

Figure 6:
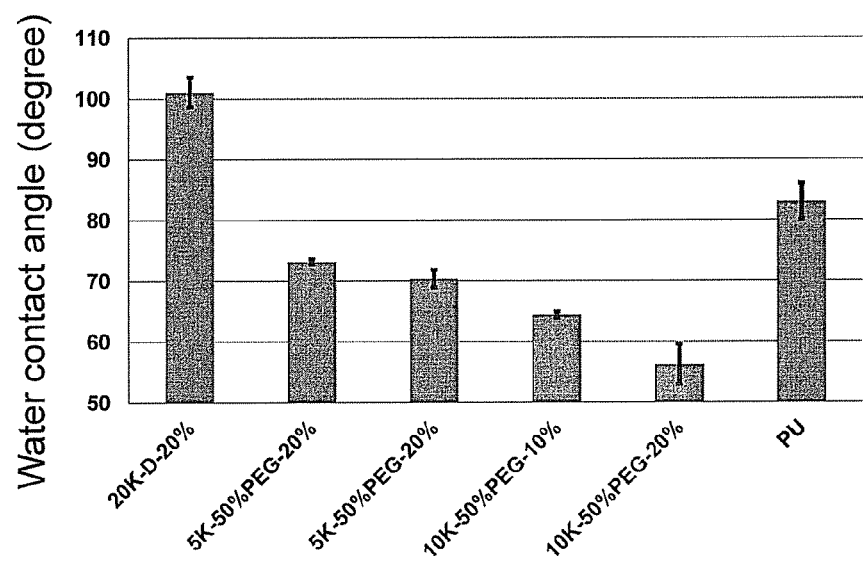
FIG. 6 shows the water contact angle (WCA) of PDMS-PEG and PDMS coatings. The WCA value is a mean of three replicate measurements and the error bar represents one standard deviation from the mean.

The WCA of the PDMS-PEG coatings was compared to that of coatings having only PDMS. The comparison of WCA between these coatings is shown in FIG. 6. The WCA of PDMS-PEG coatings was substantially less than that of the PDMS and polyurethane (without siloxane) coatings. It can also be seen from FIG. 6 that with an increase in the PEG content in the PDMS-PEG coatings, the WCA decreased, indicating the presence of PEG polymer on the surface due to self-stratification.

Figure 7:
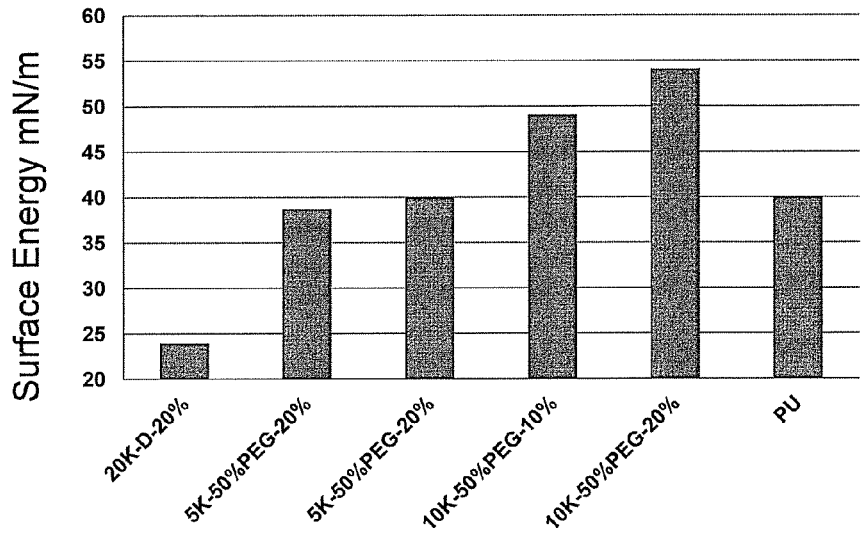
FIG. 7 shows the surface energy (SE) of PDMS-A and PDMS as made coatings and after one month of DI water immersion and one month of DI water immersion then one week of artificial sea water (ASW) immersion. SE was calculated using WCA and MI contact angle using Owens-Wendt method.

The surface energy of PDMS-A and PDMS coatings is shown in FIG. 7. The SE of siloxane-PEG coatings was higher compared to PDMS and PU coatings due to lower WCA. Therefore, Confocal Raman spectroscopy, ATR-FTIR, AFM and WCA studies have confirmed the presence of the both hydrophobic siloxane and hydrophilic PEG at the surface, giving an amphiphilic nature to the surface of the coatings.

Laboratory Biological Screening of PDMS-PEG Coatings

The fouling-release performance of the coatings was tested using a diverse set of marine organisms including a diatom (microalga) *Navicula incerta*, bacteria (*Cytophaga lytica*), and *Ulva* sporelings. The performance of the coatings was compared with Intersleek® 700 (INT 757), Intersleek® 900 (INT970), Intersleek® 400 (INT 425), Silastic® T2 and PU. The Intersleek coatings are commercial silicone-based fouling-release marine coatings while Silastic T2 is a hydrosilation cured silicone. PU is a polyurethane without any PDMS component. The coatings were tested initially for leachate toxicity for all the organisms and the leachates were found to be non-toxic to the growth of all the test organisms.

Figure 8:
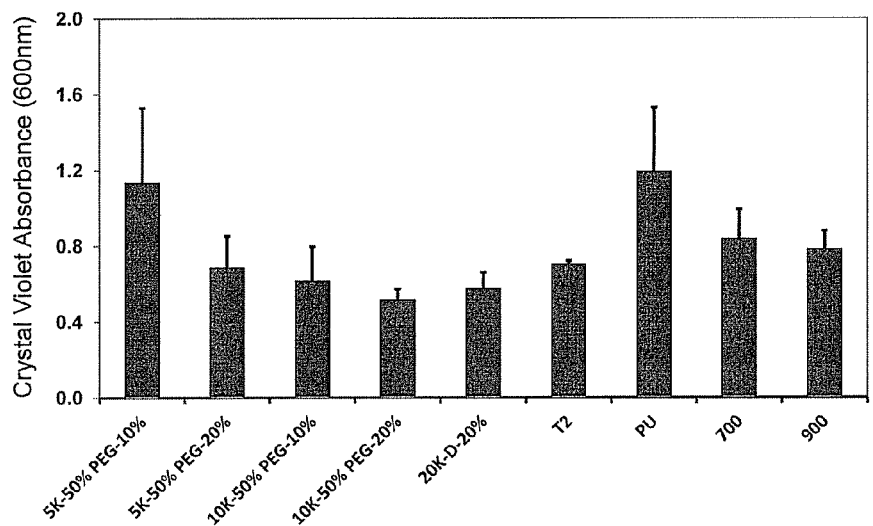
FIG. 8 shows retention of *C. lytica* biofilm. The values shown are a mean of three replicate measurements and the error bar represents one standard deviation from the mean.

The coatings were tested for fouling-release performance for the marine bacterium *Cytophaga lytica* using the retention and retraction assay and then for adhesion by water jetting the coatings at 20 psi. Biofilm retention of *C. lytica* is represented in FIG. 8. The experimental coatings (except 5K-50% PEG-10%) showed less retention of biofilm as compared to the standard coatings. The increase in PEG amount in coatings reduced retention of biofilm. The low biofilm retention shows that bacteria did not adhere as well to the siloxane-PEG coatings as compared to standard coating although the same amount of bacteria was present for attachment (Ekin et al, J. Polym. Sci, Part A: Polym. Chem. 2006, 44(16), 4880-4894), indicating low affinity of *C. lytica* to the siloxane-PEG coatings.

Figure 9:
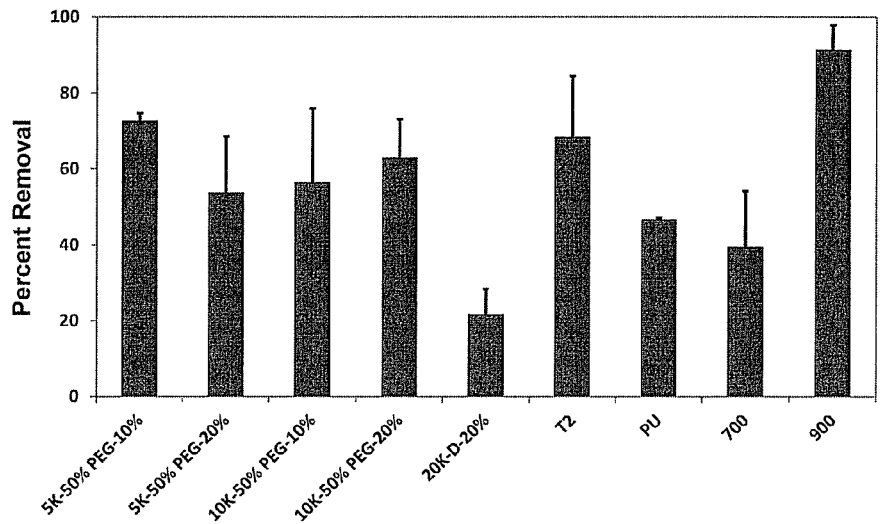
FIG. 9 shows *C. lytica* removal at water jet pressure of 138 kPa from PDMS-PEG and PDMS coating compared with the standard coatings. The values shown are a mean of three replicate measurements and the error bar represents one standard deviation from the mean.

Removal of *C. lytica* from the coatings is shown in FIG. 9. The removal of *C. lytica* from the PDMS-PEG coatings was better than PDMS, INT 757 and PU coatings. The performance of PDMS-PEG coating was comparable to T2 while INT970 was the best performing coating with removal greater than 90%. Among experimental coatings, 5K-50% PEG-10% showed best performance in the series. Interestingly, this coating has more biofilm retention compared to all other experimental coating.

Figure 10:
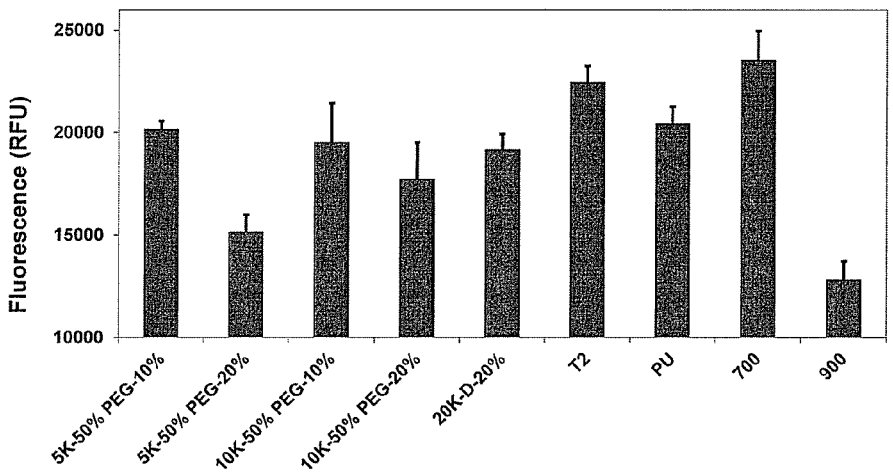
FIG. 10 shows attachment of *N. incerta* to the coatings surface quantified by fluorescence intensity. The values shown are a mean of three replicate measurements and the error bar represents one standard deviation from the mean. The fluorescence value reported is directly proportional to the amount of algal cells attached to the coating surfaces.
Figure 11:
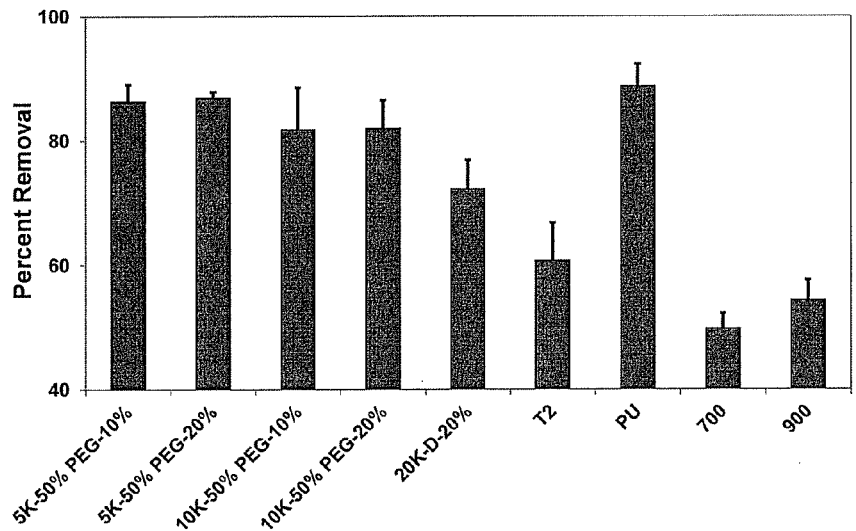
FIG. 11 shows *N. incerta* removal at water jet pressure of 138 kPa for PDMS-PEG and PDMS coatings compared with the standard coatings. The values shown are a mean of three replicate measurements and the error bar represents one standard deviation from the mean.

The attachment of diatoms to surfaces of the coatings and its removal at a water jet pressure of 138 kPa is shown in FIGS. 10 and 11, respectively. The diatom attachment to the PDMS-PEG coatings was less than T2, PU and INT 757 but greater than INT970. 5K-50% PEG-20% showed best performance among experimental coatings and this performance was similar to INT970.

Removal of *N. incerta* for the PDMS-PEG and PDMS coatings is shown in FIG. 11. The performance of the PDMS-PEG coating was significantly better than the PDMS, and standards INT 757, INT970 and T2. *Navicula* has been shown to adhere weakly to hydrophilic surfaces and hence its high removal from the PDMS-PEG coating indicates the presence of hydrophilic PEG at the surface. For INT 757, INT970 and T2, removal of *N. incerta* was 50 to 65% and that of PDMS-PEG was 85%, indicating that *N. incerta* adheres strongly to hydrophobic surfaces. However, the performance of the PDMS-PEG coating performance was comparable to PU for removal of *N. incerta*.

Figure 12:
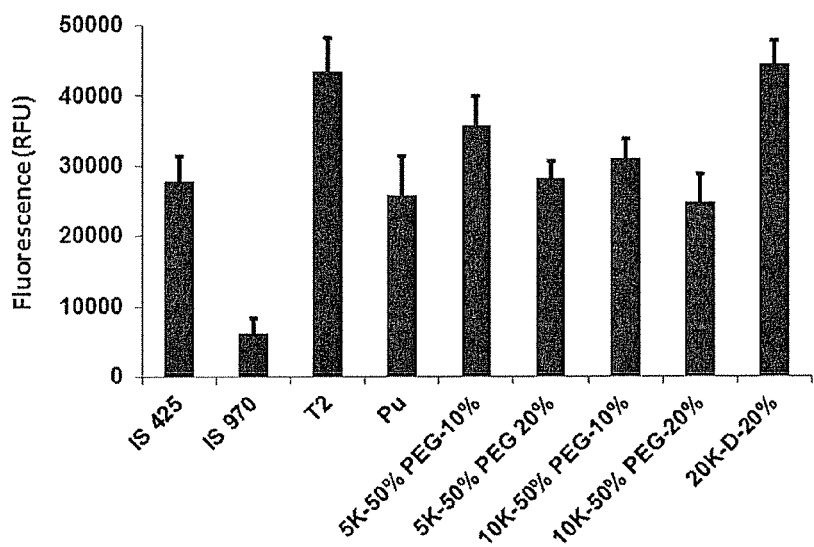
FIG. 12 shows biomass of *Ulva* sporeling before jetting presented as RFU values measured as extracted chlorophyll. Each point is the mean of 6 replicates. Error bars show 95% confidence limits.

The attachment of *Ulva* to the coatings surface is represented in FIG. 12. The attachment of *Ulva* to the PDMS-PEG coating was less than T2 and 20K-D-20% and comparable to INT 425 and PU. However, attachment of *Ulva* to INT970 was the lowest compared to the coatings tested.

Figure 13:
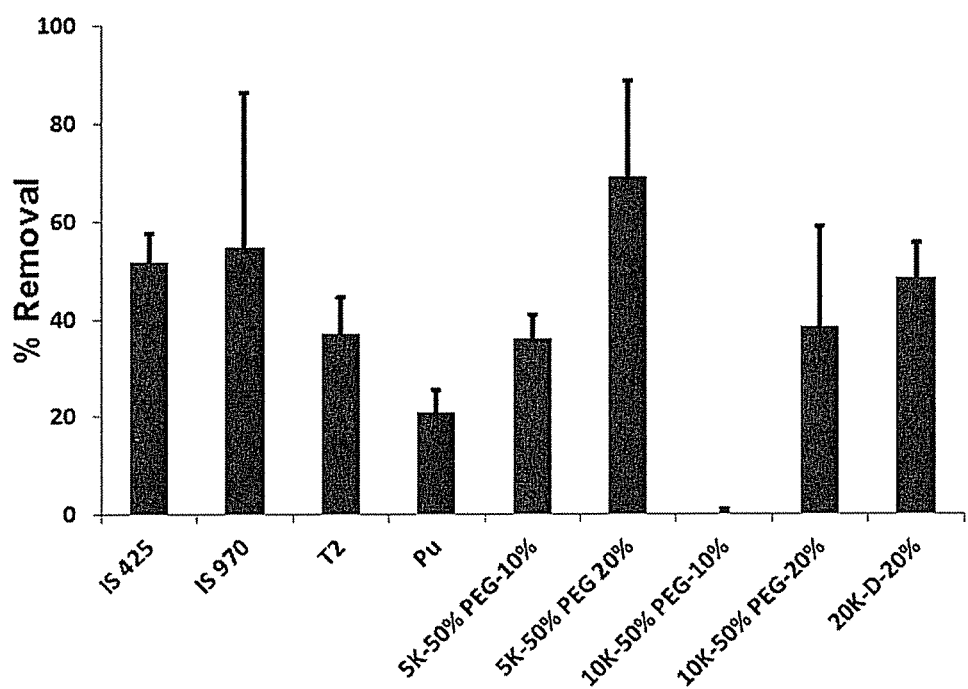
FIG. 13 shows a percentage removal of *Ulva* sporelings after 7 days growth using an impact pressure of 111 kPa with the spin-jet. Each point is the mean of 6 replicates. Error bars show 95% confidence limits derived from arcsine transformed data.

Removal of sporelings (young plants) of *Ulva* from the PDMS-PEG, PDMS and standard coatings is shown in FIG. 13. Siloxane-PEG showed better removal than T2 and PU while its removal was comparable to INT 425 and INT970. Siloxane-PEG coating 5K-50% PEG-20% showed best removal of *Ulva*. Therefore, siloxane-PEG coatings showed good removal for both diatoms and *Ulva*.

Siloxane-polyurethane coatings based on APT-PDMS (Ekin et al., J. Coat. Technol. Res. 2007, 4(4), 435-451) and monoamine terminated PDMS (Summer et al., Biofouling 2010, 26(8), 961-972) have shown good release performance for *Ulva*, and bacteria. However, microalgae *Navicula incerta* showed affinity for these coatings when tested in laboratory assays. As discussed earlier, due to the exactly complementary behavior of macroalga *Ulva* and microalgae *Navicula incerta* towards hydrophobic surfaces including siloxane-polyurethane coatings, amphiphilic siloxane-polyurethane coatings based on siloxane polymer having PEG chains and terminal amine functionality was designed in this study. Siloxane-PEG coatings showed good performance towards both of these two complementary algae and thus these types of coatings can be good candidates for the development of fouling release coatings.

The complete disclosures of all patents, patent applications including provisional patent applications, and publications, and electronically available material (e.g., GenBank amino acid and nucleotide sequence submissions) cited herein are incorporated by reference. The foregoing detailed description and examples have been provided for clarity of understanding only. No unnecessary limitations are to be understood therefrom. The invention is not limited to the exact details shown and described; many variations will be apparent to one skilled in the art and are intended to be included within the invention defined by the claims.

What is claimed is:

1. A polymer comprising
a polysiloxane backbone; and
a plurality of hydrophilic polymeric pendant side chains linked to the polysiloxane backbone through a thioether linkage.

2. The polymer of claim 1 wherein the polysiloxane backbone comprises a reactive functional end group at one or both ends.

3. The polymer of claim 2 wherein the reactive functional end group comprises an alkyl amine.

4. The polymer of claim 2 wherein the polysiloxane backbone comprises polydimethylsiloxane.

5. The polymer of claim 2 wherein the polysiloxane backbone comprises a copolymer comprising siloxane and lactone.

6. The polymer of claim 2 wherein hydrophilic polymeric pendant side chains comprise polyalkylene glycol.

7. The polymer of claim 6 wherein the polyalkylene glycol comprises polyethylene glycol.

8. The polymer of claim 2 which is prepared by the process of reacting a polyvinylsiloxane with a hydrophilic polymeric monothiol.

9. A polyurethane comprising the polymer of claim 2.

10. A composition, coating, film, adhesive, gel, oil or lubricant comprising the polymer of claim 2.

11. An article comprising the composition, coating, film, adhesive, gel, oil or lubricant of claim 10.

12. An article comprising a surface coated with the polymer of claim 2.

13. A polymer comprising
a polysiloxane backbone comprising a reactive functional end group at one or both ends; and
a plurality of hydrophilic polymeric pendant side chains;
wherein the polysiloxane backbone comprises a copolymer comprising siloxane and lactone.

14. The polymer of claim 13 wherein the reactive functional end group comprises an alkyl amine.

15. The polymer of claim 13 wherein hydrophilic polymeric pendant side chains comprise polyalkylene glycol.

16. The polymer of claim 15 wherein the polyalkylene glycol comprises polyethylene glycol.

17. A composition, coating, film, adhesive, gel, oil or lubricant comprising the polymer of claim 13.

18. An article comprising the composition, coating, film, adhesive, gel, oil or lubricant of claim 17.

19. An article comprising a surface coated with the polymer of claim 13.

20. A polymer comprising
a polysiloxane backbone comprising a reactive functional end group at one or both ends; and
a plurality of hydrophilic polymeric pendant side chains;
which is prepared by the process of reacting a polyvinylsiloxane with a hydrophilic polymeric monothiol.

21. A polyurethane comprising a polymer comprising:
a polysiloxane backbone comprising a reactive functional end group at one or both ends; and
a plurality of hydrophilic polymeric pendant side chains.

22. A method for making an amphiphilic polymer, the method comprising combining a hydrophilic polymeric monothiol reactant and a polyvinylsiloxane reactant in the presence of a catalyst for a time and under conditions to yield an amphiphilic polymer comprising a polysiloxane backbone and a plurality of hydrophilic polymeric pendant side chains.

23. The method of claim 22 wherein the monothiol is supplied in molar excess.

24. The method of claim 22 wherein the polyvinylsiloxane reactant is a linear polyvinylsiloxane comprising a reactive functional group at one or both ends.

25. An amphiphilic polymer prepared by the method of claim 22.

* * * * *